(12) United States Patent
Li

(10) Patent No.: US 8,907,863 B2
(45) Date of Patent: Dec. 9, 2014

(54) METHOD AND APPARATUS FOR ELIMINATING SEAM BETWEEN ADJOINED SCREENS

(76) Inventor: Zhongqing Li, Beijing (CN)

( * ) Notice: Subject to any disclaimer, the term of this patent is extended or adjusted under 35 U.S.C. 154(b) by 2193 days.

(21) Appl. No.: 11/667,885

(22) PCT Filed: Aug. 5, 2005

(86) PCT No.: PCT/CN2005/001203
§ 371 (c)(1),
(2), (4) Date: May 16, 2007

(87) PCT Pub. No.: WO2006/053474
PCT Pub. Date: May 26, 2006

(65) Prior Publication Data
US 2008/0186252 A1    Aug. 7, 2008

(30) Foreign Application Priority Data

Nov. 16, 2004  (CN) .......................... 2004 1 0091097
Nov. 16, 2004  (CN) .......................... 2004 1 0091098
Nov. 16, 2004  (CN) .......................... 2004 1 0091099

(51) Int. Cl.
| G09G 5/00 | (2006.01) |
| H04N 9/12 | (2006.01) |
| G09F 9/30 | (2006.01) |
| G02F 1/1333 | (2006.01) |
| G09G 3/20 | (2006.01) |
| H04N 9/31 | (2006.01) |
| G09G 3/36 | (2006.01) |
| G02F 1/1335 | (2006.01) |

(52) U.S. Cl.
CPC ............... *G09G 3/20* (2013.01); *G09G 3/3611* (2013.01); *G09G 2300/026* (2013.01); *G02F 1/133524* (2013.01); *G09G 2320/02* (2013.01); *H04N 9/12* (2013.01); *G09F 9/30* (2013.01); *G02F 1/13336* (2013.01); *H04N 9/3147* (2013.01)
USPC ............................................ 345/1.1; 345/1.2

(58) Field of Classification Search
CPC .................... G09G 2300/02; G09G 2300/023; G09G 23/0026
USPC ............................ 345/1.1–1.3; 359/448–455; 385/115–120
See application file for complete search history.

(56) References Cited

U.S. PATENT DOCUMENTS 4,139,261 A * 2/1979 Hilsum ..................... 385/120
4,761,641 A * 8/1988 Schreiber ..................... 345/1.3

(Continued)

FOREIGN PATENT DOCUMENTS

| CN | 2193000 | 3/1995 |
| CN | 1104795 | 7/1995 |

(Continued)

*Primary Examiner* — Alexander Eisen
*Assistant Examiner* — Nelson Lam

(57) ABSTRACT

A method for eliminating a seam between adjoined screens includes step A: acquiring an original image and adapting the acquired image to an image translation in subsequent step B; step B: translating the acquired image toward the position of the seam; and step C: reverting the translated image to the original one. An apparatus for eliminating a seam between adjoined screens includes an image acquisition module, an image translation module and an image reversion module. The image acquisition module is configured for acquiring an original image and transmitting the acquired image to the image translation module. The image translation module is configured for translating the received image toward the position of the seam so as to cover the seam by the translated image. The image reversion module is configured for receiving the translated image from the image translation module and reverting the image to the original one.

41 Claims, 17 Drawing Sheets

(56) References Cited

U.S. PATENT DOCUMENTS

| | | | |
|---|---|---|---|
| 5,129,028 A * | 7/1992 | Soltan | 385/120 |
| 5,251,280 A * | 10/1993 | Asada et al. | 385/115 |
| 5,465,315 A * | 11/1995 | Sakai et al. | 385/116 |
| 5,502,457 A | 3/1996 | Sakai et al. | |
| 5,572,034 A * | 11/1996 | Karellas | 250/368 |
| 6,180,944 B1 * | 1/2001 | Robinson et al. | 250/370.09 |
| 6,324,000 B1 * | 11/2001 | Soulis | 359/449 |
| 6,359,617 B1 * | 3/2002 | Xiong | 715/848 |
| 6,483,482 B1 | 11/2002 | Kim | |
| 6,850,296 B2 | 2/2005 | Liu et al. | |
| 7,106,290 B2 | 9/2006 | Inukai et al. | |
| 7,345,728 B2 | 3/2008 | Lee et al. | |
| 2002/0048438 A1 * | 4/2002 | Veligdan | 385/120 |
| 2002/0168157 A1 * | 11/2002 | Walker et al. | 385/115 |
| 2003/0107586 A1 * | 6/2003 | Takiguchi et al. | 345/629 |
| 2003/0206254 A1 * | 11/2003 | Liu et al. | 349/73 |
| 2004/0051944 A1 * | 3/2004 | Stark | 359/448 |
| 2005/0083331 A1 * | 4/2005 | MacKinlay | 345/473 |
| 2006/0077544 A1 * | 4/2006 | Stark | 359/448 |
| 2009/0033615 A1 | 2/2009 | Cho et al. | |
| 2014/0037257 A1 * | 2/2014 | Yang et al. | 385/116 |

FOREIGN PATENT DOCUMENTS

| | | |
|---|---|---|
| CN | 2283951 | 9/1998 |
| GB | 2317068 | 3/1998 |
| JP | 61-165786 A | 7/1986 |
| JP | 61-188580 A | 8/1986 |
| JP | 6-313815 A | 11/1994 |
| JP | 10214567 | 8/1998 |
| JP | 2000-347586 A | 12/2000 |
| JP | 2000-347587 A | 12/2000 |
| JP | 2001-005414 A | 1/2001 |
| JP | 2001-092389 A | 4/2001 |
| JP | 2002-033186 A | 1/2002 |
| JP | 2002-149113 A | 5/2002 |
| JP | 2002-221626 A | 8/2002 |
| JP | 2003-156490 A | 5/2003 |
| JP | 2003-208001 A | 7/2003 |
| JP | 2003-322875 A | 11/2003 |
| JP | 2004-177632 A | 6/2004 |
| JP | 2004-324490 A | 11/2004 |
| JP | 2005-107535 A | 4/2005 |
| JP | 2009-037194 A | 2/2009 |
| WO | WO-98/43273 A1 | 10/1998 |

* cited by examiner

Fig. 10
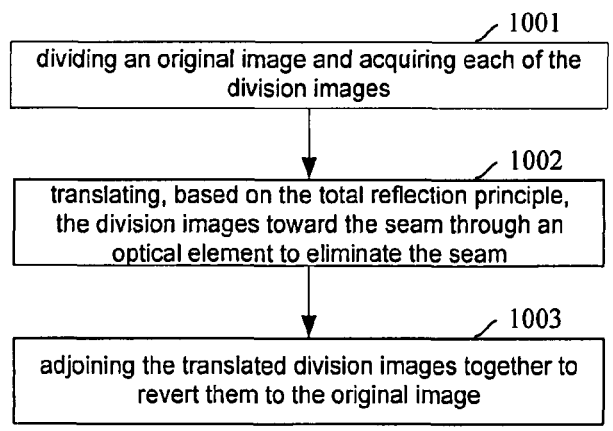
Fig.11A                                    Fig.11B
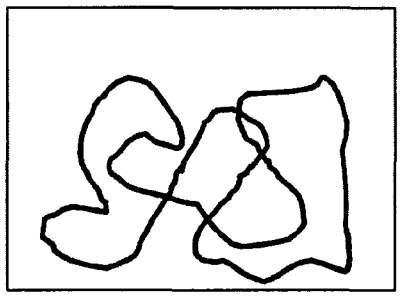    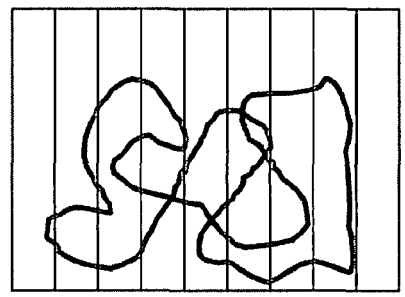
Fig. 11C                                   Fig. 11D
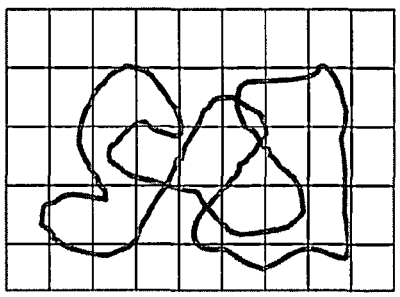    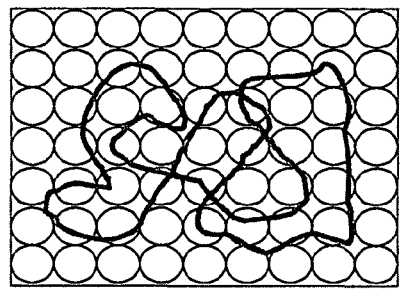

METHOD AND APPARATUS FOR ELIMINATING SEAM BETWEEN ADJOINED SCREENS

BACKGROUND OF THE INVENTION

1. Field of Invention

The present invention relates to the field of image displaying, and more specifically, to a method for eliminating a seam between adjoined screens and an apparatus thereof.

2. Description of Prior Art

Recently, an increasing number of computers tend to the development of minimization with the continuous progress of electronic information technology. Accompanying the minimization, data-processing capability of computers has been enhanced, and a wider range of data types can be processed. Small-sized portable computers can be employed to fulfill such tasks as processing, storage and assembling for massive data, thereby significantly facilitating our daily work and life. For example, a notebook computer can be utilized to process stock information, map data and image data and display contents corresponding to the processing result on its screen. It is inevitable, however, that such computer minimization leads to a remarkable reduction in screen size, which makes it difficult for a user to gain a clear view of a reduced size screen. In particular to the above data requiring a high display quality, a reduced size screen cannot meet the requirement for display quality. This disables a user to acquire detailed information by a portable computer and accordingly causes inconvenience to the user. Take an example that when a user downloads map data via a notebook computer, the user cannot find a clear map with a large amount of information as he expects due to a small screen, such as an overview graph for determining roughly his location or a local detail graph for showing routes. Another example is that when a user processes stock data by a notebook computer, the user cannot obtain clearly huge stock information he desires due to a small screen, such as the overall tendency and detailed information on an individual share. In addition, computers can process multimedia data, such as video, with a gradually enhanced performance. Therefore, users can display videos by use of portable devices, for example, a notebook computer.

Although these portable devices are sufficiently capable of video data processing, with the limit on screen size, viewers cannot gain a visual enjoyment as that provided by a large screen. Thus, the video data display ability of a portable device is degraded. Moreover, in applying computers to project plotting and multi-window operation, a relatively large-sized screen is required to facilitate users' practice.

As can be seen from the above description, in the current progress of computer minimization, there is a contradiction between dimension reduction for an integral device and the need for a large screen. At present the contradiction is usually overcome by adopting screen-adjoining technology, which expands screen size by adjoining multiple screens without increasing the size of a device. Furthermore, in practical applications, there are many occasions with the need for a large-sized display, such as airports, train stations, athletic competitions and grand exhibitions, where a screen of a very large size is required to display information for people at a distance. On the other hand, the manufacture cost increases and production technique becomes more complex as the size of a screen expands. Therefore, the screen-adjoining technology is also applicable to occasions with the need for a large-sized display.

Screen-adjoining technology usually adopted in prior art include CRT adjoining, LCD adjoining and projector adjoining. Since a projector imposes a strict requirement on ambient light in that an image cannot be seen clearly with intense ambient light, the projector is applicable to only a narrow range of places, for example, indoors. As for CRT adjoining, LCD adjoining, the dominant problem is that there is a seam between adjoined screens no matter how close the screens are brought to each other. Specific cases are described as follows.

For a CRT, the display is effected by bombarding electrons to a fluorescence screen on the inner surface of a tube, which is made of a glass shell of certain thickness and evacuated into vacuum. The glass shell must have certain thickness to guarantee some strength. Therefore, the peripheral edge of a CRT tube can not be reduced to a width smaller than the thickness of its glass shell, which is usually 5 mm.

For a LCD, a complete screen is formed by injecting liquid crystals, whose color and grayscale can vary when applied to a voltage, into a small room and arranging a number of such rooms in an array. The edge of LCD is protected with packaging materials to prevent liquid crystal from leaking. The width of the edge is commonly not smaller than 5 mm.

As a result of the edge width of each of CRT and LCD, a seam appears inevitably in the process of adjoining screens. In prior art, the following techniques are used to eliminate a seam.

The First Method:

As shown in FIG. 1A to 1C, digital and optical image processing methods are employed at the edges of two screens. At first, the image on the edges of the screens is contracted by certain ratio. Then an optical lens is used to enlarge the contracted image while the image on the rest of the screens remains unchanged. Finally, the enlarged image is used to fill the gap caused by a seam during the adjoining process.

In the figures, the optical lens is denoted by reference numeral 140. Optical glass of different shapes and structures are used in FIG. 1A to 1C, respectively. Such optical glass can magnify an image by refracting light at its edge. The screen is denoted by reference numeral 30, and the dark part sandwiched by two screens 30 represents the seam between the screens. As shown in FIG. 1A to 1C, the light is refracted after penetrating the optical lens so as to magnify the image at the edge, thereby significantly reducing the visible width of the seam. This method can reduce the seam width, however, it has the following drawbacks.

(1) This method can only reduce the width of a seam other than completely eliminating it. Even when this method is adopted, the edge of a screen can be still visible and the thus formed seam is about 1 mm in thickness. This is roughly acceptable for a large screen display, while for the case of adjoining small screens in potable devices, it can be hardly accepted. Since small screens are generally adjoined for a portable device and the eyes of a user are close to the screen of the portable device, even a slight gap can appear obvious. This degrades image quality and further provokes the user's discontentment.

(2) If this method is adopted, since the optical lens placed on the screen is thick, the screen increases in size and mass while deteriorates in portability. For example, if two LCDs are combined, the seam between them is 10 mm wide, and the optical lens above them is 25 mm thick. The optical lens of such thickness will apparently adds the size and mass of the screen and makes it less convenient to carry.

(3) Since this method compresses and magnifies the image at the edge, the image itself will be damaged.

Besides, this method requires a precise calculation for the area of the edge image to be compressed and magnified, thereby making it complex to implement and unsuitable for practical applications.

The Second Method:

Frensnal lens is used in this method, in which the Frensnal lens magnifies the image on each of two screens by certain times to conceal the seam between the screens. As referenced to FIG. 2A, reference numeral 20 indicates two screens adjoined to each other, reference numeral 11 indicates the Frensnal lens, reference numeral 12 indicates a pressure-sensing plate, and reference numeral 13 indicates a flexible thin film. Although it can eliminate the seam, this method has the following disadvantages.

(1) In order to acquire a proper magnification factor, the Frensnal lens must be located a distance from the screens 20, otherwise the image cannot be magnified. This leads to a thicker display with an increased size, thereby worsening the portability of a device configured by this method.

(2) Bending the light through the Frensnal lens gives rise to a retrace phenomenon, therefore, in order to obtain the effect of a magnifier, fine zigzagged concentric circle strips must be spread over the lens surface. Such strips will adversely affect images and thereby image quality.

Besides, the processing cost for Frensnal lens is high, thus a high price hinders its application to a wide range.

The Third Method:

In terms of large screen application, as shown in FIG. 2B, the conventional technology as disclosed in the document Chinese Patent Application No. 01215900.X employs a means for display magnification by optical fiber (hereafter, referred to as fiber) transmission. The optical fiber 3 is used as a light-collecting opening, the other end thereof extends into an arcuate light-emitting head 2 to magnify images transmitted by each fiber. Reference numeral 1 denotes a holder, reference numeral 4 denotes a fiber support, and the fibers between the holder 1 and the fiber support 4 dangles independently of each other. This method is suitable for some occasions of image enlargement, and the apparatus has a large size.

SUMMARY OF THE INVENTION

In consideration of the above problems, the principal object of the present invention is to provide a method for eliminating a seam between adjoined screens and an apparatus thereof, which can completely eliminating the seam in the adjoined screen without any damage to images and significant increase in size and thickness of the screen.

To reach the above object, according to one aspect of the present invention, a method for eliminating a seam between adjoined screens is proposed, the method comprises:

Step A: acquiring an original image and adapting the acquired image to an image translation in subsequent step B;

Step B: translating the acquired image to the position of a seam;

Step C: reverting the translated image to the original one.

According to one aspect of the present invention, said step A includes dividing the original image displayed on the screens pixel by pixel, and then acquiring a corresponding pixel from the division pixels by a first end of a fiber in a provided fiber means;

Said step B includes transmitting the acquired pixel through the tilted fiber from its first end to its second end, and therefore translating the image displayed on the screens to the position of the seam.

Said step C includes merging the pixels emitted from the second ends of all fibers to reconstruct the original image.

According to one aspect of the present invention, said step A includes dividing the image displayed on the screens into individual pixels, and determining the number of fibers in the fiber means; tilting the fibers of the determined number in the fiber means toward the position of the seam in the screen at such an angle that the image translated to the position of the seam by the tilted fibers can cover the seam.

According to one aspect of the invention, an apparatus for eliminating a seam between adjoined screens is proposed. The apparatus includes an image acquisition module, an image translation module and an image reversion module. The image acquisition module is configured for acquiring an original image and transmitting the acquired image to the image translation module. The image translation module is configured for translating the received image to the position of the seam so as to cover the seam by the translated image. The image reversion module is configured for receiving the translated image from the image translation module and reverting the image to the original one.

According to one aspect of the present invention, said image acquisition module is a first end belonging to each of tilted fibers in fiber means and close to the side of the screen. Said image translation module is a transmission part of each of the tilted fibers in the fiber means. Said image reversion module is a second end belonging to each of the tilted fibers in the fiber means and far away from the side of the screen.

According to one aspect of the present invention, said image translation module is the fiber means, and each of said image acquisition module and said image reversion module is a separate means.

According to one aspect of the present invention, said image acquisition module is a separate means, and said image translation module and said image reversion module are the fiber means.

According to one aspect of the present invention, said image reversion module is a separate means, and said image translation module and said image acquisition module are the fiber means.

According to one aspect of the present invention, said image translation module is fiber means composed of an entire tilted fiber.

Said image acquisition module and/or image reversion module is software module or optical element.

According to one aspect of the present invention, said fiber means is configured as follows.

The first end of each of the fibers in the fiber means is brought to contact with two screens such that the plane formed by all the first ends can cover the entire image displayed on the screens. The interval between the linear transmission parts of the fibers remains constant, and the linear transmission parts are in contact with and connected adhesively to each other. The second end of each of the fibers is tilted toward the position of the seam such that the plane formed by all the second ends can at least cover the seam. The end of each of fibers, which is close to the side of the screen, is said first end, and the end of each of fibers, which is far away from the side of the screen, is said second end.

According to one aspect of the present invention, said fiber means is configured as follows.

The first end of each of the fibers in the fiber means is brought to contact with two screens such that the plane formed by all the first ends can cover the entire image displayed on the screens. The interval between the gradually-curved transmission parts of the fibers remains constant, and the gradually-curved transmission parts are in contact with and connected adhesively to each other. The second end of each of the fibers is tilted toward the position of the seam such that the plane formed by all the second ends can at least cover the seam. The end of each of fibers, which is close to the side of the screen, is said first end, and the end of each of fibers, which is far away from the side of the screen, is said second end.

According to one aspect of the present invention, said gradually-curved fiber is a fiber bent in a line or curve form.

According to one aspect of the present invention, said fiber means is configured as follows.

The first end of each of the fibers in the fiber means is brought to contact with two screens such that the plane formed by all the first ends can cover the entire image displayed on the screens. The interval between the linear transmission parts of the fibers is expanded to such an extent that the plane formed by all the second ends, that is, the other ends of the transmission parts of the fibers, can cover the seam. The transmission parts are in contact with and connected adhesively to each other. The end of each of fibers, which is close to the side of the screen, is said first end, and the end of each of fibers, which is far away from the side of the screen, is said second end.

According to one aspect of the present invention, the screens each have one said fiber means.

According to one aspect of the present invention, said fiber means is applied to each of the adjoined screens as one integral fiber means.

According to one aspect of the present invention, said image translation module is configured as an optical element composed of translation units, each of the translation units can translate an incident light to the position of the seam based on the total reflection principle.

Said image acquisition module is configured for dividing and acquiring the original image in a unit of the sectional shape of said translation unit, and then transmitting the acquired divided image to a corresponding translation unit.

Each of the translation units in said image translation module is configured for translating each of the division images to the position of the seam.

Said image reversion module is configured for receiving each of the division images translated by each of the translation units, and merging all the division images to reconstruct the original image.

As mentioned above, the present invention has the following advantages. By translating the image to the seam between the screens with help of the fiber means or the optical element, the seam can be completely removed. In addition, the translation process imposes no damage to the image quality, and the employed fiber means or optical element is small in size and mass, thereby no adversely effect on the device's own portability. The present invention can be realized with cheap materials in a simple manner without the need for massive and precise calculation. Thus it can be rapidly applied to a variety of products and result in considerable economical benefit.

BRIEF DESCRIPTION OF THE DRAWINGS

FIG. 10 is a flowchart of the method for eliminating a screen seam by an optical element of the present invention;
FIG. 11A to 11D are schematic diagrams for dividing an image in an embodiment of the method shown in FIG. 10 according to the present invention.

DETAILED DESCRIPTION OF PREFERRED EMBODIMENTS

The present invention is to provide a method for eliminating a seam between adjoined screens and an apparatus thereof. According to the method, an image displayed on the screens is translated to the position of the seam to such an extent that the translated image can cover the seam, thereby eliminating the seam due to the frame thickness of the screen. The apparatus acquires an original image at first and translates the acquired image to the position of the seam. Then, it reverts the translated image to the original image which can cover the seam.

Figure 1A:
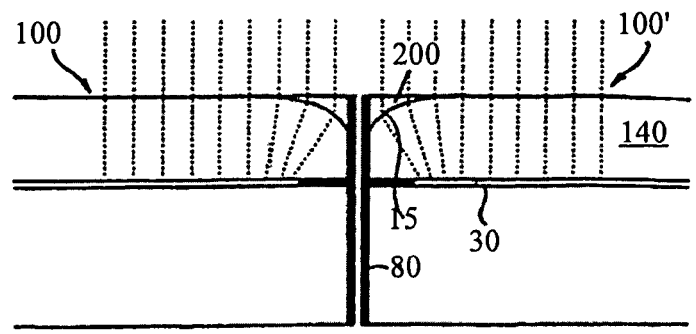
FIG. 1A to 1C is a schematic diagram showing the first conventional method.
Figure 1B:
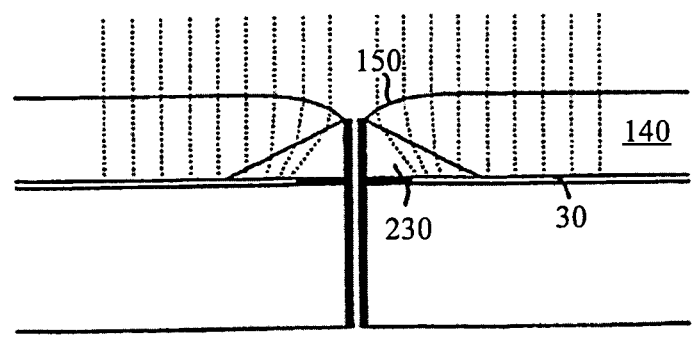
Figure 1C:
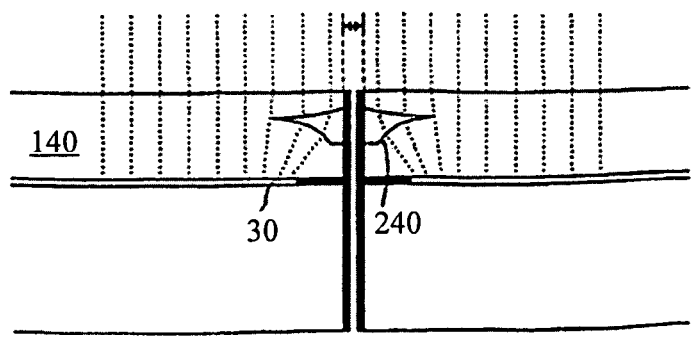
Figure 2A:
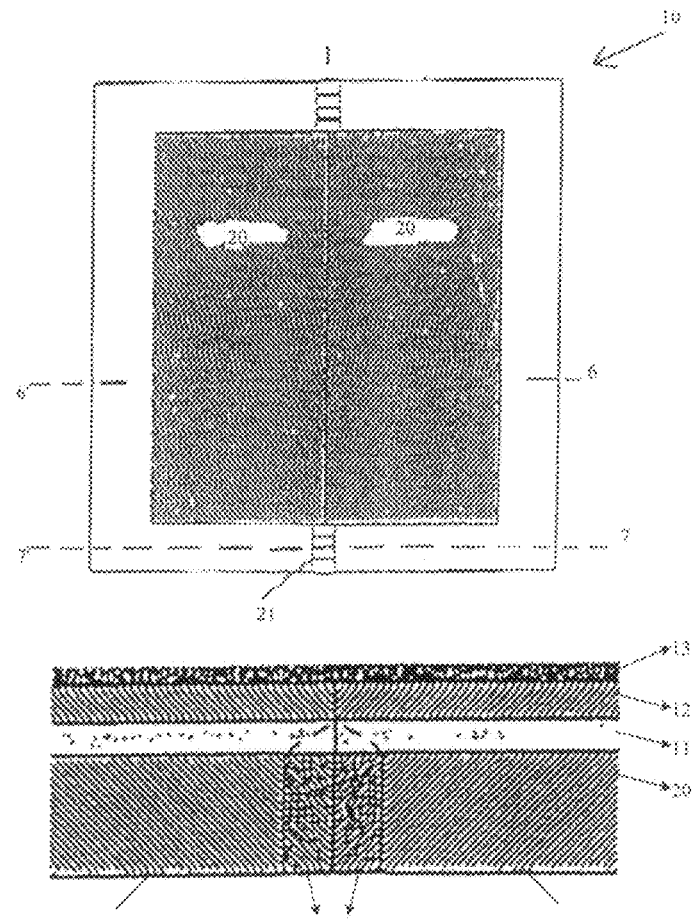
FIG. 2A is a schematic diagram showing the second conventional method.
Figure 2B:
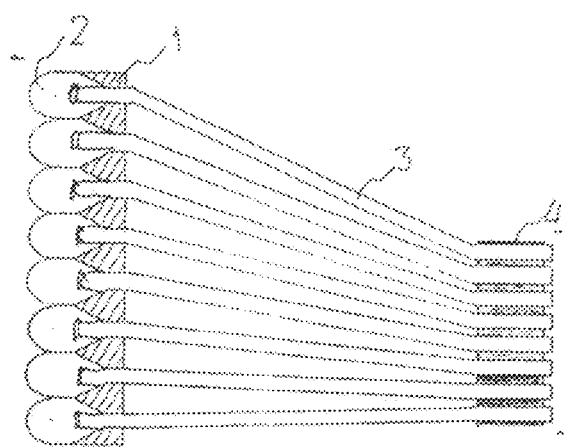
FIG. 2B is a schematic diagram showing the third conventional method.
Figure 3:
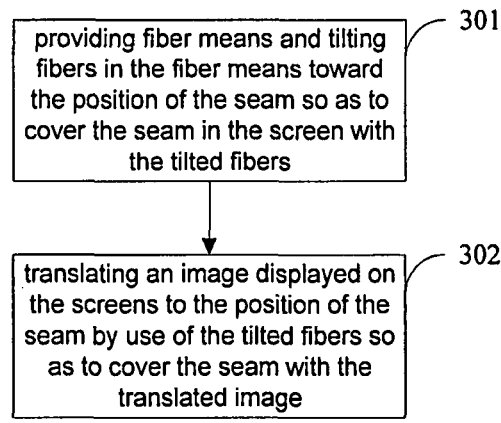
FIG. 3 is a flowchart of the method for eliminating a screen seam by fiber means of the present invention.

The present invention can be realized by use of different methods, for example, the method for eliminating a screen seam with fiber means as shown in FIG. 3, and the method for eliminating a screen seam with an optical element as shown in FIG. 10. It's obvious to those skilled in the art that the present invention is not limited to the above methods.

Hereafter the present invention is described with reference to the drawings.

Referring to FIG. 3, in the present invention, a seam in an adjoint screen can be eliminated through the following steps.

Step 301: providing fiber means and tilting fibers in the fiber means toward the position of the seam so as to cover the seam in the screen with the tilted fibers;

Step 302: translating an image displayed on the screens to the position of the seam by use of the tilted fibers so as to cover the seam with the translated image.

The First Embodiment (1) The Specific Process in Step 301

Figure 4:
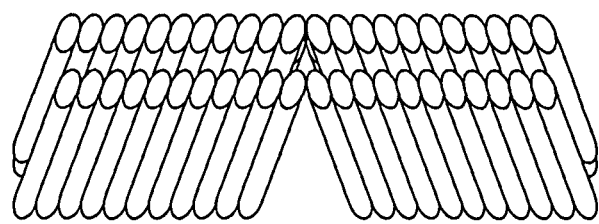
FIG. 4 is a schematic diagram of fiber means provided in an embodiment of the method shown in FIG. 3 according to the present invention.

Considering the case of only adjoining two screen in the first embodiment of the present invention, fiber means is provided as shown in FIG. 4, and tilted fiber in this means are used to translate a respective image displayed on each of the screens to the position of the seam. In this embodiment, Step 301 includes:

Step 3011: determining the number of fibers in the fiber means. Specifically, the whole image displayed on the two screens is divided pixel by pixel and each of the pixels is acquired by a corresponding fiber in the fiber means. Therefore, the number of the fibers in the fiber means is determined by providing the fibers in such a manner that each of the fibers corresponds to one ore more pixels to be transmitted via the fiber. In other embodiments of the present invention, one pixel can be transmitted via several corresponding fibers, and the number of the fibers in the fiber means can be determined accordingly. It should be noted that the manner for determining the number of fibers imposes no effect on the realization of the present invention.

Step 3012: The fiber means is configured based on the determined number of the fibers and the fibers in the fiber means is tilted toward the position of the screen seam, wherein the fibers should be tilted at such an angle that the image can cover the seam after being translated to the position of the seam via the tilted fibers. For the purpose of simplicity, hereafter an end of each of the fibers close to the screen is referred to as the first end of the fiber, and an end of each of the fibers far away from the screen is referred to as the second end of the fiber. In the present embodiment, the fibers are tilted toward the position of the seam in a manner shown in FIG. 4. The detailed process is as follows.

The fibers in the fiber means are arranged together and bonded to each other through their contact surfaces. Then, the first end of each of the fibers remains fixed, and the second ends of all the fibers, as a whole, are shifted toward the position of the seam in such a manner that the second ends of the fibers, which correspond to each of the two screens, are adjoined together and thus a plane is formed by all the second ends as shown in FIG. 4. This plane can cover the seam between the screens, and each of the fibers is tilted at a certain angle through the above process.

During the detailed process for tilting the fibers, since the contact surface of each of the fibers has a limited area, in order to enhance the adhesive strength, the following method can be employed to tilt the fibers at certain angle.

Figure 5:
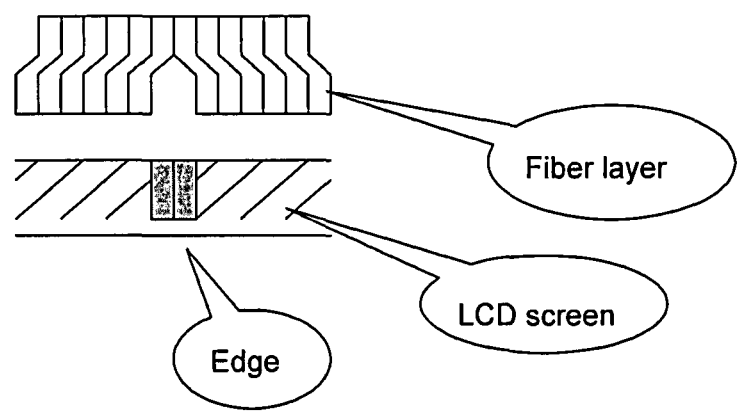
FIG. 5 is a schematic diagram of fiber means provided in an embodiment of the method shown in FIG. 3 according to the present invention.

The fibers in the fiber means are arranged together and bonded to each other through their contact surfaces. Then, the first end of each of the fibers remains fixed, and, as shown in FIG. 5, each of the fibers in the fiber means is bent at arbitrary position between the two ends to form an angle a, and therefore the fiber is divided into a first linear part and a tilted part. Next, the fiber is bent at arbitrary position in the tilted part to form a second linear part parallel to the first linear part. The bending angle is selected in such a proper manner that, with the bending, a plane formed by combining the second ends of the fibers for both the screens can cover the seam between the screens. In this process, although the fibers are bonded to each through their contact surfaces, since the fibers are bent, the area of the contact surface of each fiber is increased and thus the adhesive strength is enhanced. It should be noted that the fiber tends to break and its transmission characteristics deteriorate dramatically if it is bent forcibly. Therefore, the bending should be carried out without any damage to the characteristics of the fiber. The linear bending shown in FIG. 5 will damage the characteristics of the fiber. Such depiction is adopted only because the graphics software can express the smooth curve effect for the fiber. When used in practical application, the fiber should appear gradually and smoothly curve.

In the present embodiment, each of the two screens may be provided with fiber means as mentioned above, respectively; the two screens may be provided with one integral fiber means as mentioned above. The present invention can be realized whichever is chosen.

(2) The Specific Process in Step 302

After configured as shown in FIG. 4 or 5, the fiber means is used to translate the image displayed on each of the screens to the position of the seam, thereby covering the seam among the screens.

The Second Embodiment

Figure 6:
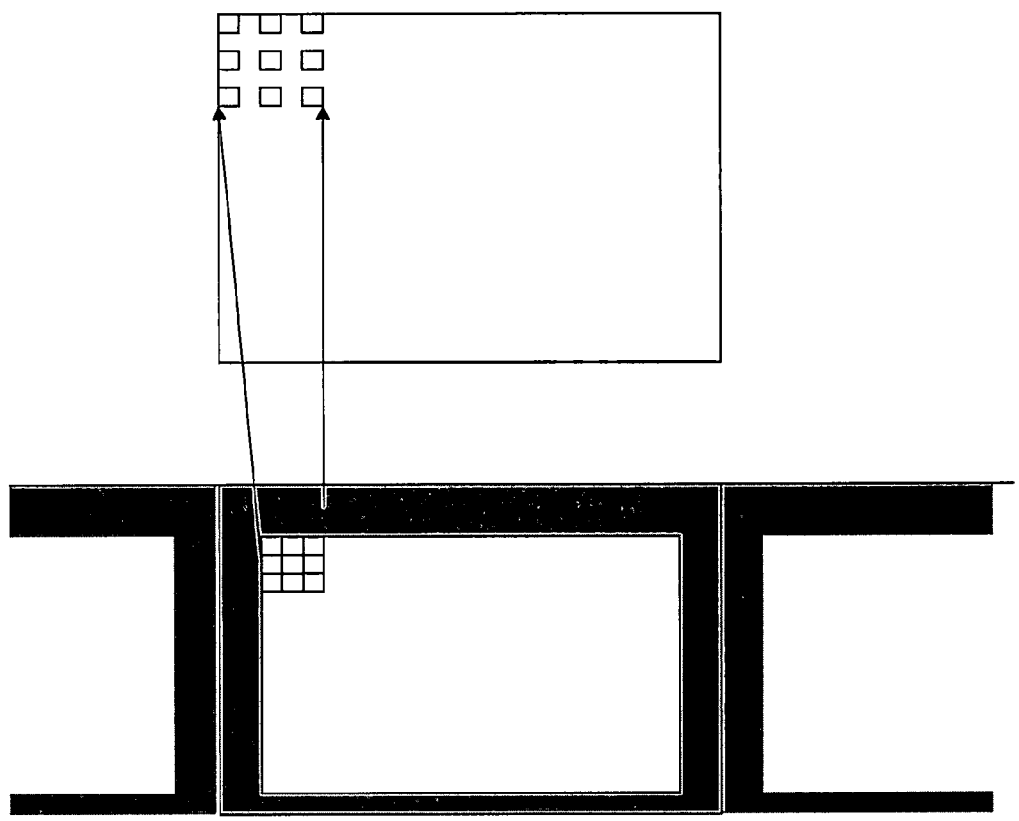
FIG. 6 is a schematic diagram for dividing and translating an image in an embodiment of the method shown in FIG. 3 according to the present invention.

The first embodiment realizes only the elimination of a seam between two screens. Referring to FIG. 6, in the second embodiment, the interval between two pixels is extended through a fiber, and the image obtained after this extension can cover a seam among a plurality of screens. As a result, the seam is eliminated during the process of adjoining the plurality of screens.

(1) The Specific Process in Step 301

Step 301a: determining the number of fibers in fiber means in the same manner as that described in the above step 3011;

Step 301b: determining the size of the seam among the screens, and extending the interval between the second ends of the fibers in the fiber means based on the determined size of the seam, so the image transmitted via the fiber means can cover the seam.

Figure 7:
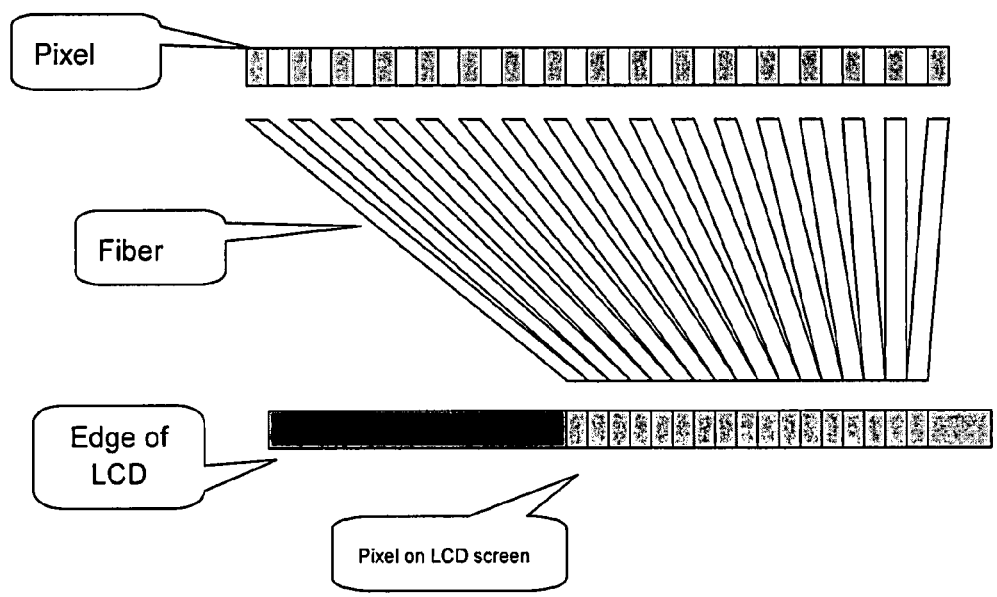
FIG. 7 is a schematic diagram of fiber means provided in an embodiment of the method shown in FIG. 3 according to the present invention.

Referring to FIG. 7, a corresponding pixel of an image is acquired by the first end of each of the tilted fibers and then transmitted to the second end of the fiber via the transmission part thereof. Since each of the fiber is tilted toward the position of the seam, the entire image can be translated integrally to the position of the seam by transmitting each pixel via a corresponding fiber. Each of the fibers may acquire one or more corresponding pixels, or several fibers may acquire collectively one corresponding pixel. The specific process is as follows. The first ends of the fibers are fixed, and each of the fibers is tilted at a different angle to make the sum of the intervals among the second ends of all the fibers equal to or greater than the width of the seam to be eliminated. Therefore, a plane formed by all the second ends can cover the whole seam or part of the seam. In the present embodiment, the intervals among the second ends of all the fibers are the same, and their sum is equal to the width of the seam to be eliminated. In other embodiments of the present invention, the intervals among the second ends of all the fibers may be different from each other so long as their sum is equal to or greater than the width of the seam to be eliminated. In addition, in the present embodiment, the fibers in the fiber means are bonded to each other by making the contact part of one of the fibers adhere to that of another fiber.

Figure 8A:
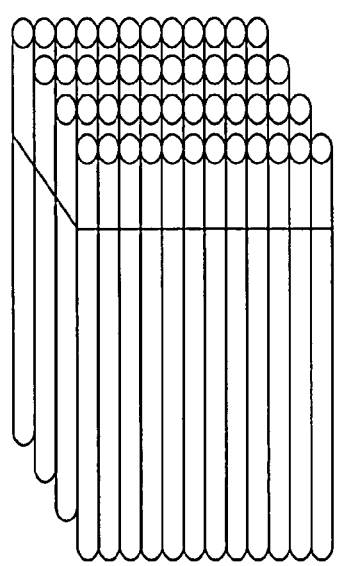
FIG. 8A to 8C are schematic diagrams for tilting a fiber in an embodiment of the method shown in FIG. 3 according to the present invention.
Figure 8B:
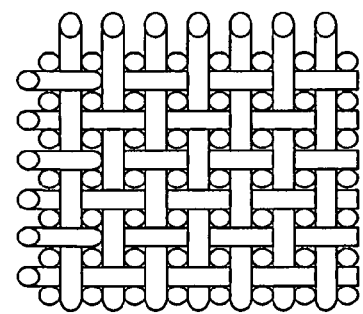
Figure 8C:
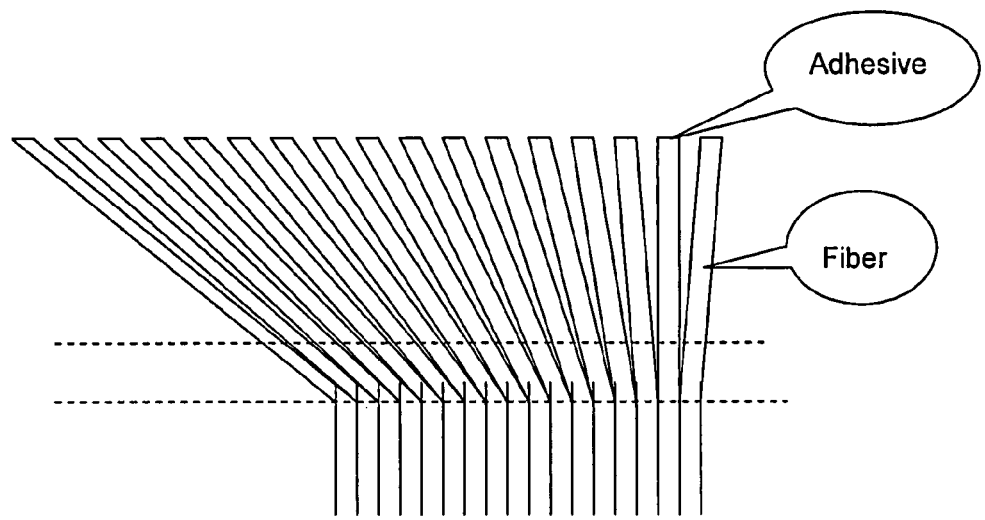

As shown in FIG. 8A to 8C, each of the fibers can be tilted at a different angle by using uniform infiltration specified as follows.

After the first ends of a bundle of fibers are fastened firmly as shown in FIG. 8A, a new fiber or any other material of a uniform thickness is inserted into each of the intervals of all the fibers from the second end at an angle of 90 degree with respect to the bundle of the fibers, as shown in FIG. 8. Each of the bundled fibers and each of the new fibers or materials are interlaced alternately along the X-axis direction and the Y-axis direction respectively and form a structure similar to the mesh part of a tennis racket. Then the bundle of the fibers is immersed into an adhesive tank, and the adhesive infiltrates through the gaps between the fibers so as to bond the fibers to each other. After the adhesive coagulates, as shown in FIG. 8C, each of the bundled fibers is truncated based on the width of the seam to be eliminated and thus tilted at a different angle. In FIG. 8C, a truncation path is denoted by a dotted line.

(2) The Specific Process in Step 302

Figure 9:
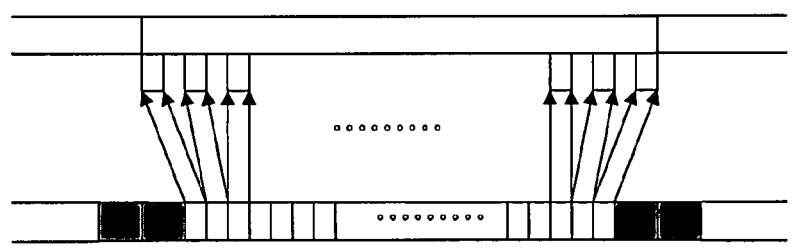
FIG. 9 is a schematic diagram for dividing and translating pixels to realize an embodiment of the method shown in FIG. 3 according to the present invention.

Referring to FIG. 9, in Step 302, each of the pixels is transmitted to the outside via the corresponding second end of each of the fibers in the fiber means shown in FIG. 7. Since the intervals between the fibers have been extended, the gaps between the pixels are increased in proportion, and it is possible to eliminate the seam by extending the gaps between the pixels and making the sum of the pixel widths in the same direction as the width of the seam equals to the width of the seam.

In addition to the seam elimination by fiber means, an optical element can be employed to eliminate a seam between adjoined screens. FIG. 10 is a flowchart for eliminating a screen seam by an optical element of the present invention. In the adjoining process, for example, optical glass can be used to translate an image and thus eliminate a seam between adjoined screens.

Hereafter the present invention is described in details with reference to the drawings.

Referring to FIG. 10, in the present invention, a seam between adjoined screens can be eliminated through the following steps.

Step 1001: dividing an original image and acquiring each of the division images;

Step 1002: translating, based on the total reflection principle, the division images toward the seam through an optical element to eliminate the seam;

Step 1003: adjoining the translated division images together to revert them to the original image.

Hereafter each of the above steps is described in details with reference to the drawings.

The Third Embodiment (1) The Specific Process in Step 1001

In order to achieve a better effect for image translation, in Step 1001, the whole image is divided by a dividing unit that is the sectional shape of the incident end of a translation unit in the optical element. As a result, the parts of the divided image each have approximately the same size as that of the incident end of the translation unit, and the translation unit in the optical element can obtain sufficiently corresponding part of the divided image, thereby improving the translation quality.

Referring to FIG. 11A to 11D, an original image is shown in FIG. 11A. If the incident end of the translation unit has a bar shape, the original image can be divided into bars as shown in FIG. 11B; if the incident end of the translation unit has a square shape, the original image can be divided into squares as shown in FIG. 11C; if the incident end of the translation unit has a circular shape, the original image can be divided into circles as shown in FIG. 11D. In other embodiments of the present invention, the original image can be divided in any other manner according to the shape of the incident end of a dividing unit in an optical element, as long as the parts of the divided image each have approximately the same size as that of the incident end of the dividing unit.

(2) The Specific Process in Step 1002

Figure 12:
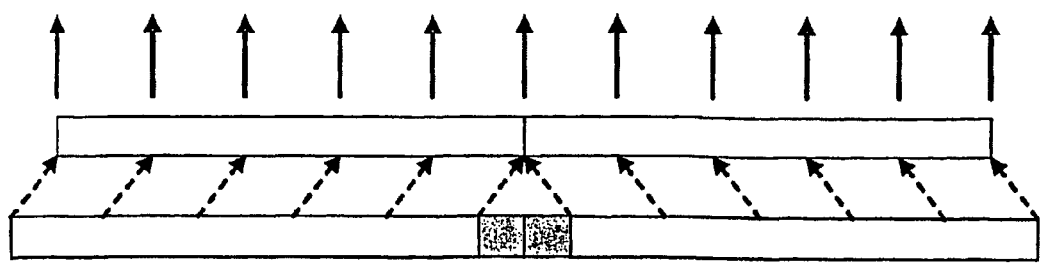
FIG. 12 is a schematic diagram for translating an image in an embodiment of the method shown in FIG. 10 according to the present invention.

Referring to FIG. 12, the image is translated integrally by the optical element based on the total reflection principle. In other words, the image is translated toward the screen seam by a distance so that the seam can be cover with the translated image and thus eliminated.

Figure 13:
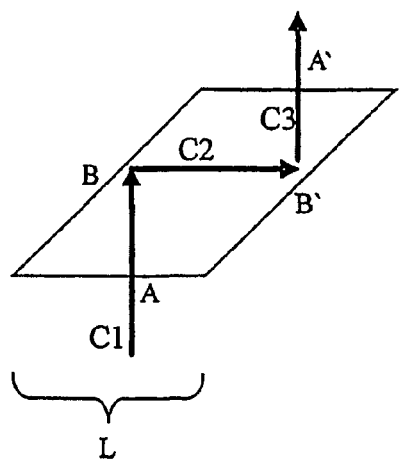
FIG. 13 is a schematic diagram for translating an image by a translation unit to realize the method shown in FIG. 10 according to the present invention.

The translation unit in the optical element is used for image translation in the present embodiment. FIG. 13 is a principle diagram for translating an image by a translation unit according to the method shown in FIG. 10. The division image corresponding to one of the translation units in the optical lens enters the translation unit through its incident end. Based on the total reflection principle, the incident light from the division image is totally reflected for even times in the translation unit, and then exit from the exit end of the translation unit along the same direction as that of the incident light but at a position away from the incident position by the translation distance. When each of the translation units translates the corresponding division image as shown in FIG. 13, the images can be translated as a whole.

The translation unit performs total reflection on the incident light twice based on the total reflection principle, and thus shifts the path of the incident light in parallel with the incident direction by a distance to fulfill image translation. According to the total reflection principle, the following formula (1) must be satisfied to realize a total reflection of light:

$$n = \sin 90°/\sin C \quad (1)$$

where n is defined as the ratio between the refractive index of the material constituting the translation unit and the refractive index of air, and C is defined as a critical angle, that is, an incident angle when light enters a medium of lower refractive index from a medium of higher refractive index. A total reflection occurs when the incident angle is greater than the critical angle. Consequently, to ensure that most of the light from the original image can undergo a total reflection, a suitable material should be selected as the medium for the translation unit. Thus, the critical angle C can be as small as possible to ensure that most of the light from the original image undergoes a total reflection. In the present embodiment, optical glass is used as the medium for the translation unit. Other materials can also be used as the medium for the translation unit in other embodiments of the present invention. The present invention can be realized no matter which material is chosen.

For the purpose of simplicity, in the following discussion, it is assumed that n (the first formula) for the translation unit satisfies the total reflection requirement, and the light from the original image can be totally reflected regardless of its incident angle.

As shown in FIG. 13, the light from the original image enters the translation unit through the incident end A in the direction C1, travels linearly and then arrives at the first reflecting plane B. Since the translation unit meets the total reflection requirement, the light is totally reflected on the first reflecting plane B and the direction is changed to the direction C2. The light travels linearly in the direction C2, reaches the second reflecting plane B', undergoes a total reflection again and then turns to the direction C3. The light exits from the exit end of the translation unit, and thus the translation of the light is completed. As can be seen in FIG. 13, diverting the light from C1 to C3 means that the light is translated in the X direction by a length L of the incident end A of the translation unit. If L is longer than the frame of a screen, the translated image can block the frame completely, therefore, the seam between two screens can be eliminated. Since the translation unit can totally reflect the light of any incident angle, the light incident from the original image in other directions can be translated as described above, and the divided image can be translated by use of the translation unit.

Figure 14:
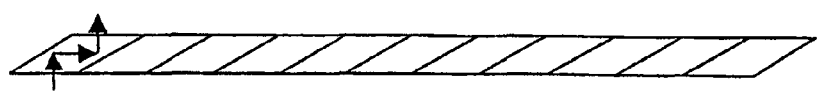
FIG. 14 is a schematic diagram of an image translation module provided in an embodiment of the method shown in FIG. 10 according to the present invention.

In the present embodiment, all the translation units in the optical element translate the whole image based on the total reflection principle. As shown in FIG. 14, one large optical element is composed of the plurality of translation units and placed above the image displayed on the screens to translate the image as a whole. Each of the translation units translates the corresponding part of the divided image toward the seam by a distance. As a result, the whole image is translated toward the seam for the purpose of elimination.

Figure 15:
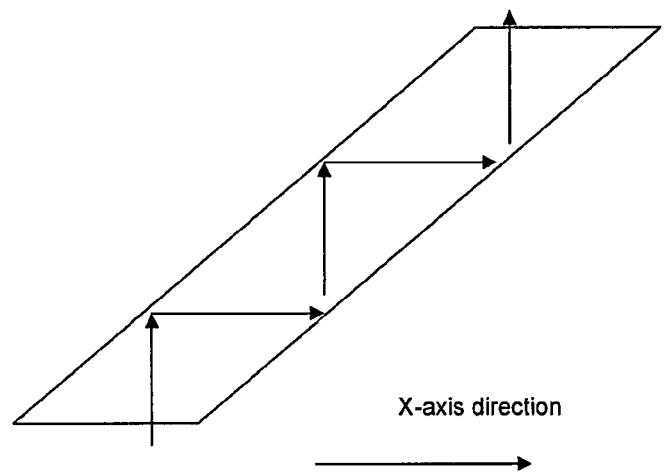
FIG. 15 is a schematic diagram of a translation unit provided in an embodiment of the method shown in FIG. 10 according to the present invention.

In the present embodiment, the incident light from the original image is totally reflected twice in the translation unit before the completion of the translation. Referring to FIG. 15, in other embodiments of the present invention, the incident light may undergo total reflection for four times or any even times in a translation unit. Since the total reflection changes only the traveling direction of the light, the above translation doesn't degrade the quality of the light.

As shown in FIGS. 13 and 15, the incident light is translated in the X-axis direction according to this embodiment, while in other embodiments of the present invention, the incident light can be translated in the X-axis direction and/or the Y-axis direction, and the whole image is therefore translation in the same direction. For example, assuming the translation unit is a rhombus prism, the incident light can be reflected in the X-, Y- and Z-axis directions, and the image can be translated in the X- and Y-axis directions.

(3) The Specific Process in Step 1003

In this embodiment, the division gap between two parts of the divided image is removed through filtering in addition to re-adjoining all the parts together. Since the division gap due to the above dividing and translating is usually image signal noise of high frequency, the filtering in this embodiment can be realized by use of a low-pass filter, which can be formed of thin film.

In the above embodiment as shown in FIGS. 12 and 14, each of the parts of the divided original image is translated via the corresponding translation unit so that the whole image can be translated. Considering that the gap between two translation units is inevitable and may give rise to the division gap in the image, the fourth embodiment including Step 1001 to 1003 can be adopted to avoid the occurrence of the division gap.

The Fourth Embodiment (1) The Specific Process in Step 1001

At first, an original image is preprocessed. A part of the image near to the side of the seam is cut off, and the rest of the image is translated toward the seam by a distance equal to the width difference between the whole width of the original image and the width of the cut-off part of the image. Finally, the cut-off part is translated and adjoined to the remaining part on the side far away from the seam, and the whole image is therefore divided and translated accordingly.

Figure 17:
FIGS. 17 and 18 are effect diagrams for dividing and translating an image in an embodiment of the method shown in FIG. 10 according to the present invention.
Figure 18:
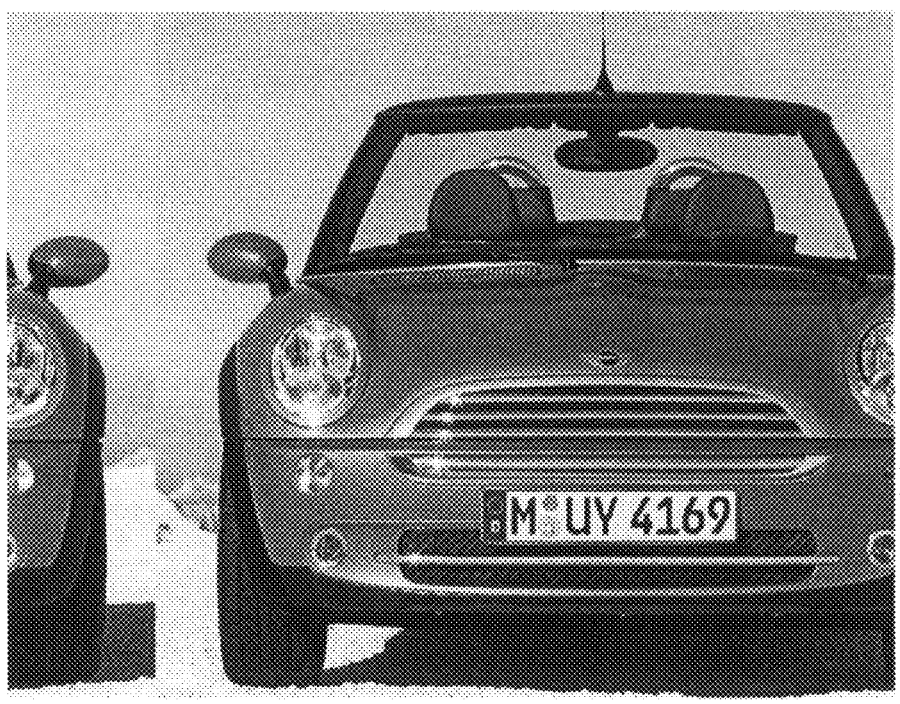

Now referring to FIGS. 17 and 18, the original image is shown in FIG. 17, and the seam is located on the right of the image. In this embodiment, the right part of the image is cut off and shifted to the left side of the remaining part so as to form the image shown in FIG. 18.

The translation of the cut-off part can be realized by using conventional techniques. One of the most convenient methods is to change the start and the end display addresses in the VGA ROM of a display adapter. For example, the data for the original image is stored in Segment C0000:0-C0000:FFF and scanning begins with the address C0000:0. If an offset is added to the start display address so as to scan from C0000:300 and subsequently Segment C0000:0-C0000:2FF, it appears that the partial image corresponding to Segment C0000:0-C0000:2FF is shifted from the start to the end, and a partial translation is obtained. In other embodiments of the present invention, other methods can be employed to translate the cut-off part of an image. Since this translation technique is well known to those skilled in the art, a detailed description thereof is omitted.

(1) The Specific Process in Step 1002

Figure 19:
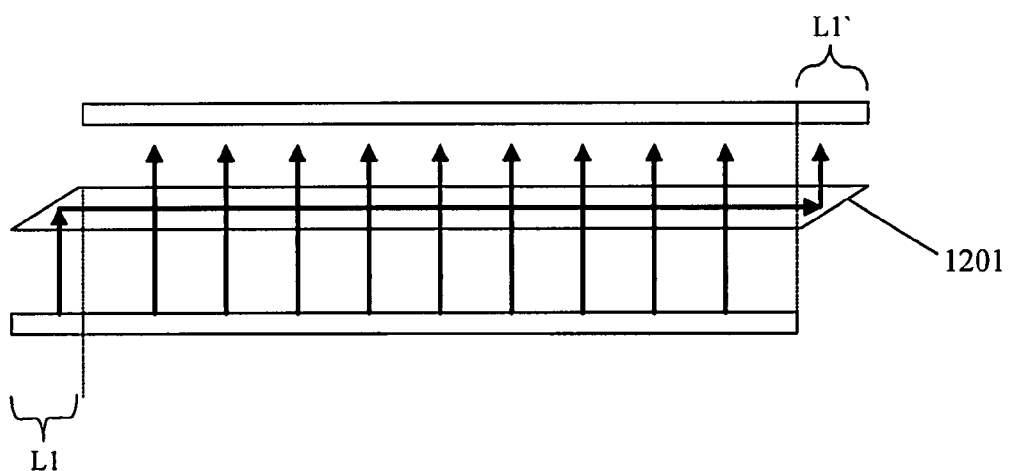
FIG. 19 is a schematic diagram for translating an image in an embodiment of the method shown in FIG. 10 according to the present invention.

Now turning to FIG. 19, two translation units on both sides of an optical lens are used to translate part of the image near the seam in accordance with the total reflection principle. In Step 1002, image acquisition is performed as follows.

Firstly, part of the image, which is close to the seam and to be translated, is cut off, and the rest of the image is translated toward the seam by a distance equal to the width of the cut-off part. Next, the cut-off part is adjoined to the image on the side far away from the seam, and the resultant image is acquired. FIGS. 17 and 18 show the image before and after the above image acquisition, respectively.

In this embodiment, an integral optical element 1201 is used to divert the light path. Both of the side surfaces of the optical element 1201 are the same as the translation unit in the above embodiment and configured to totally reflect any incident light. Moreover, the side surfaces are integrated with the middle part of the optical element 1201 so as to effectively prevent the occurrence of a division gap during the translation. Now a description will be made about the process of translating an image by the optical element 1201.

As shown in FIG. 19, it is assumed that the seam is located on the right of the original image, after the above-mentioned cut and translation, the right part of the original image near the seam has been cut off and translated to the position L1 on the left of the image, and accordingly, the remaining part is shift right by a distance equal to the width difference between the whole width of the original image and the width of the cut-off part, thereby completing the desired division and translation. The optical element 1201 in FIG. 19 processes the divided and translated image. The partial image at the position L1 is subjected to total reflection by the optical element 1201 twice and translated to the position L1', while the rest of the image directly pass through the optical glass without any change. As shown in FIG. 19 having been processed as above mentioned, the partial image, which is cut off and translated to the position L1 on the left of the original image, is translation back to the right of the original image, that is, the cut-off part is shifted toward to the seam by a distance equal to the width difference between the whole width of original image and the width of cut-off part.

Since the remaining part has been shifted accordingly toward the seam in the previous step, the original image, as a whole, has been translated toward the seam by the width of the cut-off part. In this way, the seam duo to the adjoining of two screens can be eliminated as long as the width of the cut-off part is equal to or greater than half of the width of the seam.

The above description is made by example of a seam located on the right of the original image. In the case that the seam located at any other position relative to the original image, the above processing can be executed in the same manner as that of this embodiment.

(3) The Specific Process in Step 1003

The cut-off and translated part of the image is combined with the remaining part to restore the original image.

In this embodiment, Step 1001 can include the same processing as that in the third embodiment, that is, part of the original image can be divided in the shape of the side surface of the optical element 1201 to achieve a better translation. In Step 1002, when both of the side surfaces of the optical element 1201 are used to translate the image, the translation scheme can be the same as that in the third embodiment, such as total reflection for even times, translating in the X- and/or Y-axis direction, etc., and the selection for a scheme has no impact on the realization of the present invention. In Step 1003, the filtering in the third embodiment can be employed to eliminate the division gap.

Hereafter, the apparatus according to the present invention will be concretely explained.

Figure 20:
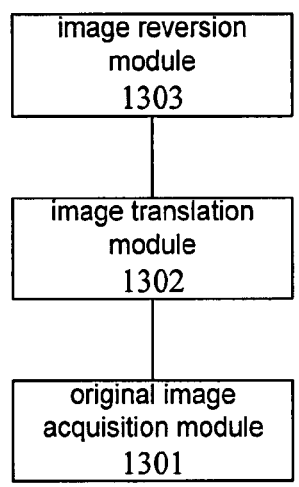
FIG. 20 is a block diagram of an apparatus according to the present invention.

As shown in FIG. 20, the apparatus according to the present invention comprises an original image acquisition module 1301, an image translation module 1302 and an image reversion module 1303. The apparatus can be provided with either fiber means or an optical element for seam elimination. Now both of the cases will be introduced respectively.

(1) When Utilizing Fiber Means to Eliminate a Seam Between Adjoined Screens

The original image acquisition module 1301 is configured for dividing a displayed image into pixels and providing the divided image to the image translation module 1302.

The image translation module 1302 is configured for translating, via the fiber means with tilted fibers, the received pixels to the position of the seam so as to cover the seam.

The image reversion module 1303 is configured for receiving the translated pixels and reverting these pixels to the original image.

In this embodiment, the original image acquisition module 1301, the image translation module 1302 and the image reversion module 1303 are all realized in one fiber means, that is, the first end of the fiber serves as the image acquisition module, the tilted transmission part of the fiber serves as the image translation module, and the second end of the fiber serves as the image reversion module. In other embodiments of the present invention, the fiber means itself may server as the image translation module, while the image acquisition module is configured as a separate means to divide a displayed image into pixels and provide the divided image to the fiber means. Besides, the image reversion module is also configured as a separate means to receive the translated pixels from the fiber means and revert these pixels to the original image. Alternatively, a new separate means can be provided as the image acquisition module, and the fiber means serves as the image translation module and the image reversion module; or a new separate means can be provided as the image reversion module, and the fiber means serves as the image translation module and the image acquisition module; or the fiber means composed of full-length titled fibers in FIG. 7 can act as the image translation module, and the image acquisition module and the image reversion module can be realized in software module. Further, these modules can be realized by optical element. The selection for a realization scheme has no effect on the present invention.

Now a detailed introduction is made on the fiber means.

The fiber means of the present invention comprises a group of fibers, and each of the fibers includes a first end, a second end and a transmission part, with the first end for acquiring a pixel of an image on a screen, the transmission part for transmitting the acquired pixel to the second end, and the second end for receiving the transmitted pixel and transmitting it outside in order to display an image.

The first implementation for the fiber means is as follows with reference to FIG. 4.

The first end of each of the fiber in the fiber means is kept contact with two screens to be adjoined so that a plane formed of the first ends of all the fiber can cover the whole image displayed on the screens. The linear transmission parts of adjacent fibers are spaced by a constant interval and bonded to each other through their contact surfaces. The second end of each of the fibers is tilted toward the position of the seam so that a plane formed of all the second ends can at least cover the seam.

In order to enhance the adhesive strength between adjacent fibers in the fiber means, the second implementation for the fiber means can be executed as shown in FIG. 5.

The first end of each of the fiber in the fiber means is kept contact with two screens to be adjoined so that a plane formed of the first ends of all the fiber can cover the whole image displayed on the screens. The intervals between broken line type of optical fiber transmission part remain constant and bonded to each other through their contact surfaces. The second end of each of the fibers is tilted toward the position of the seam so that a plane formed of all the second ends can at least cover the seam. By bending the transmission part of the fiber to broken line type fiber, the contact area between fibers can be increased, and the adhesive strength is therefore enhanced. In this embodiment, the transmission part is bent once, while in other embodiments of the present invention, the fiber can be bent further to improve the adhesive strength. Although an enhanced adhesive strength is desirable, it should be noted that the transmission quality may be degraded duo to the bending of the fiber. In other embodiments of the present invention, fibers in any other linear or curve form can be employed to increase the contact area thereof.

In order to eliminate the seam when several screens are adjoined together, the third implementation for the fiber means can be executed as shown in FIG. 7.

The first end of each of the fiber in the fiber means contacts with two screens to be adjoined so that a plane formed of the first ends of all the fiber can cover the whole image displayed on the screens. The intervals between the linear transmission parts of adjacent fibers are extended so that a plane formed of all the second ends of the fibers can cover the seam. The transmission parts of adjacent fibers are bonded to each other through their contact surfaces. With such configured fiber means, the intervals between adjacent pixels can be enlarged by the extension of the distance between adjacent fibers. As a result, the width of the seam can be decentralized into each of the pixel intervals, and the goal of seam elimination can be achieved.

In this embodiment, each of the adjoined screens can be provided with fiber means as described above. Alternatively, all the adjoined screens can be provided with one integrated fiber means as described above. Both of the schemes give the same effect in implementing the present invention.

(2) When Utilizing an Optical Element to Eliminate a Seam Between Adjoined Screens As shown in FIG. 20, the apparatus according to the present invention comprises an original image acquisition module 1301, an image translation module 1302 and an image reversion module 1303. The original image acquisition module 1301 is configured for dividing an original image into parts, acquiring each of the parts of the divided image and transmitting them to the image translation module 1302. The image translation module 1302 is configured for translating the divided original image toward the seam of the screens so as to cover the seam with the translated image. The image reversion module 1303 is configured for combining the translated parts of the image and restoring the original image.

Now the image translation module 1302 is explained with reference to the drawings.

The Fifth Embodiment

In this embodiment, the two screens have the same size and shape and the frames is of the same width. In addition, the distances at which the sides are translated respectively to the center are equal. The image translation module 1302 is an optical element having a plurality of translation units, which can direct the light toward the seam at a distance of at least half of the seam width. As shown in FIG. 13, each of the translation units can be shape in a rhombus, which has an acute angle of 45° and preferably the shape of the rhombus is a shape that is combined by two isoceles triangles with a right angle. The length of one side of the rhombus is L which is equal to or greater than half of the seam width. In other embodiments of the present invention, if the frames of the screens to be adjoined are of different widths, the side of the rhombus has a length equal to the distance at which the image is translated by the translation units.

According to the total reflection principle, the following formula must be satisfied to realize a total reflection:

$$n = \sin 90°/\sin C$$

where n is defined as the ratio between the refractive index of glass and the refractive index of air. Thus, a suitable material must be chosen as the medium of the translation unit, and for such medium, the value of n should make the critical angle C, which is calculated from n, at least smaller than a predetermined incident angle. In this embodiment, the predetermined incident angle is 45°, while in other embodiment of the present invention, it can be an angle of another size. Returning to FIG. 13, the rhombus-shaped lens has two total reflecting faces B and B'. After totally reflected on the two reflecting faces, the light can be shifted from the position A to the position A', that is, the light can be shifted at a distance of L. If L is longer than the width of a screen frame, the frame can be blocked and the seam between the two screens is thus eliminated.

The plurality of translation units of FIG. 13 can be combined into the image translation module 1302 as shown in FIG. 14.

With respect to the image translation module described in the fifth embodiment, the image acquisition module is configured to divide the whole original image in the shape of the incident end of the translation unit and make an incidence of each of the division parts of the image to the corresponding translation unit in the image translation module.

With respect to the image translation module described in the fifth embodiment, the image reversion module is configured to reunite the translated division parts into the original image.

The image acquisition module can be realized in software module, and the image acquisition module and the image reversion module can be realized with an optical element. Both of the schemes obtain the same effect.

The Sixth Embodiment

To prevent a division gap between translation units from affecting adversely the image quality, one integral optical element is employed as the image translation module 1302 in this embodiment. Each of the two side parts of the integral optical element is the translation unit in the fifth embodiment and used to translate to the position of the seam part of the image, which is preprocessed, cut off and translated away from the seam. The rest of the integral optical element is configured to transmit directly to the image reversion module 1303 the remaining part of the image, which is not cut off and translated and has been shifted toward the seam at certain distance during image preprocessing. Since during image preprocessing, the cut-off and translated partial image has been translated to the position of the seam by the translation units, and the remaining part has also been shifted toward the seam at certain distance, the image as a whole is translated toward the position of the seam by the integral optical element. FIG. 19 shows a specific example for the integral optical element, in which each of the two side parts of the integral optical element is the same translation unit as that in the fifth embodiment.

With respect to the image translation module in the sixth embodiment, the image acquisition module is configured to perform cutting and translation, that is, to cut off the part of the original image near the seam, shift the remaining part of the image toward the seam by a distance of the width of the cut-off part of the image, and translate and adjoin the cut-off part to the original image on the side far from the seam. Each of the image acquisition module and the image reversion module can be realize in software module respectively, and they can also be realized in optical element. Both of the schemes give the same effect.

With respect to the image translation module in the sixth embodiment, the image reversion module is configured to combine the translated cut-off part with the remaining part of the image.

In the fifth and sixth embodiments, the medium material and shape of the optical element in the image translation module should be appropriately selected to make the critical angle C as small as possible, therefore, most of the incident light can be totally reflected.

Figure 16:
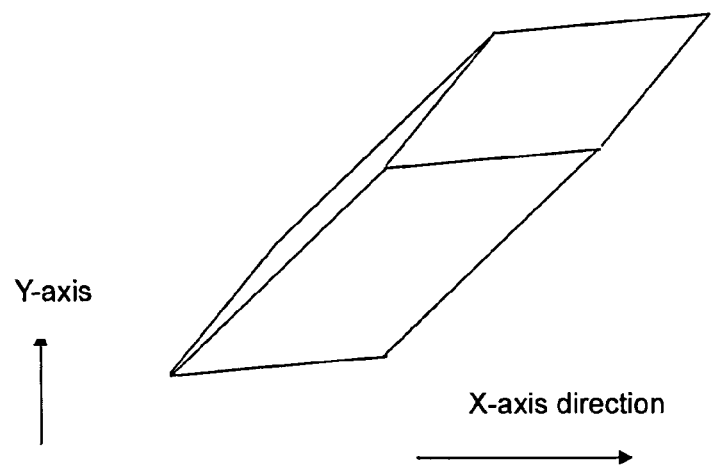
FIG. 16 is a schematic diagram of a translation unit provided in an embodiment of the method shown in FIG. 10 according to the present invention.

In addition to the translation unit of the shape shown in FIG. 13, the translation unit of the shape shown in FIG. 15 or 16 can also be used in other embodiments of the present invention. The translation unit in FIG. 15 is thicker than that in FIG. 13 and totally reflects the incident light for even times before the light leaves from the exit end. With this translation unit, the translation can be completed, and the translation distance can be increased. The translation unit in FIG. 16 has the shape of a rhombus prism and can translation the incident light in at least two directions.

In other embodiments of the present invention, as long as it can translate light based on the total reflection principle, an element of any other shape can also be employed as a translation unit and should be included in the scope of the present invention.

In the fifth and sixth embodiments of the present invention, the image reversion module 1303 can further include a filtering module for filtering the combined image to eliminate the division gap due to the adjoining of the division parts of the image. Such filtering module is, for example, a low-pass filter, which is usually formed of a thin film.

Hereafter, the present invention will be further illustrated in conjunction with various applications.

1. Notebook Computer

Figure 21A:
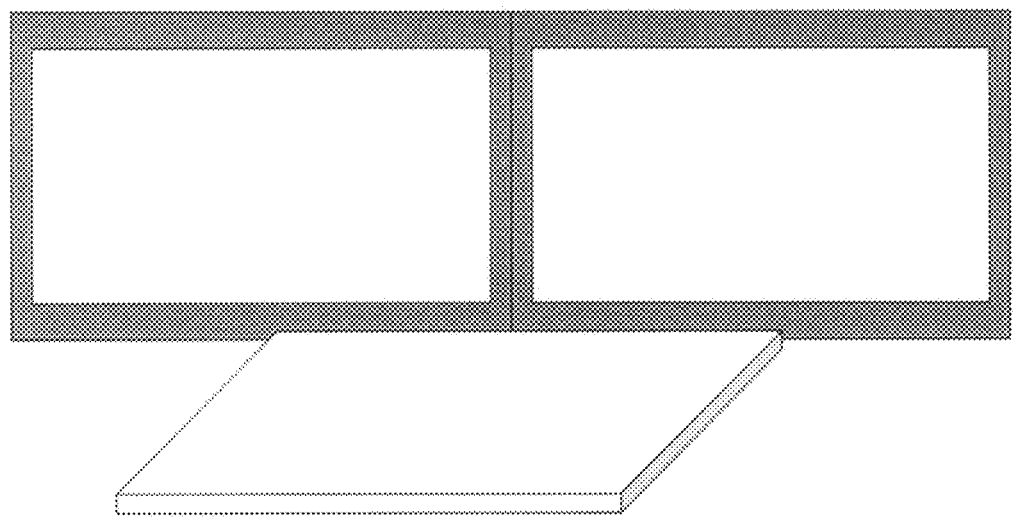
FIG. 21A to 21D are schematic diagrams for applying the present invention to a notebook computer.
Figure 21B:
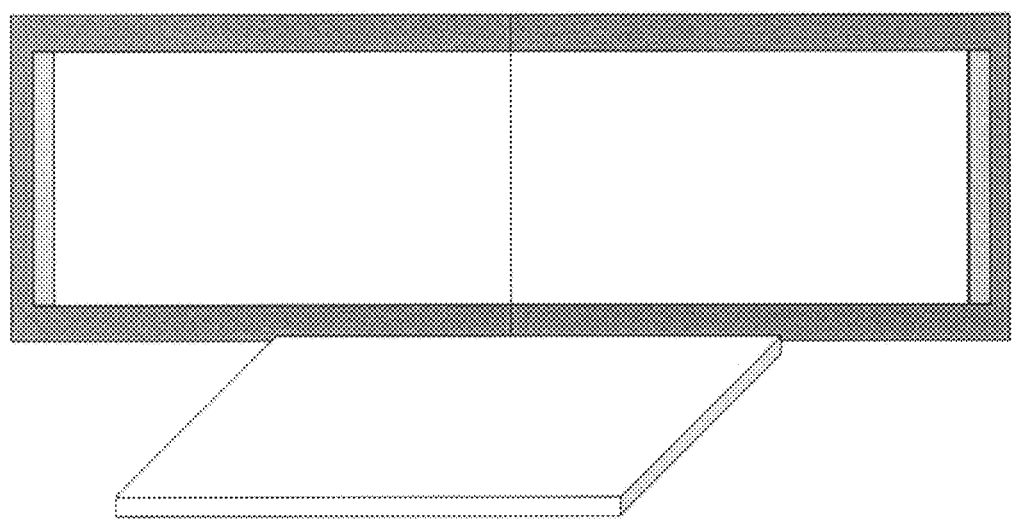
Figure 21C:
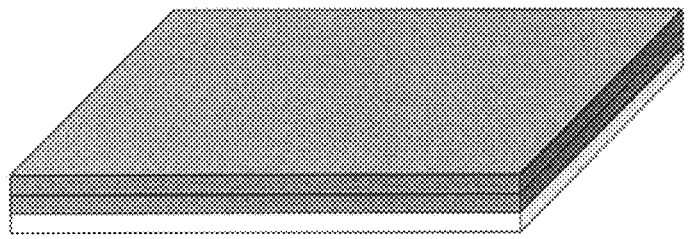
Figure 21D:
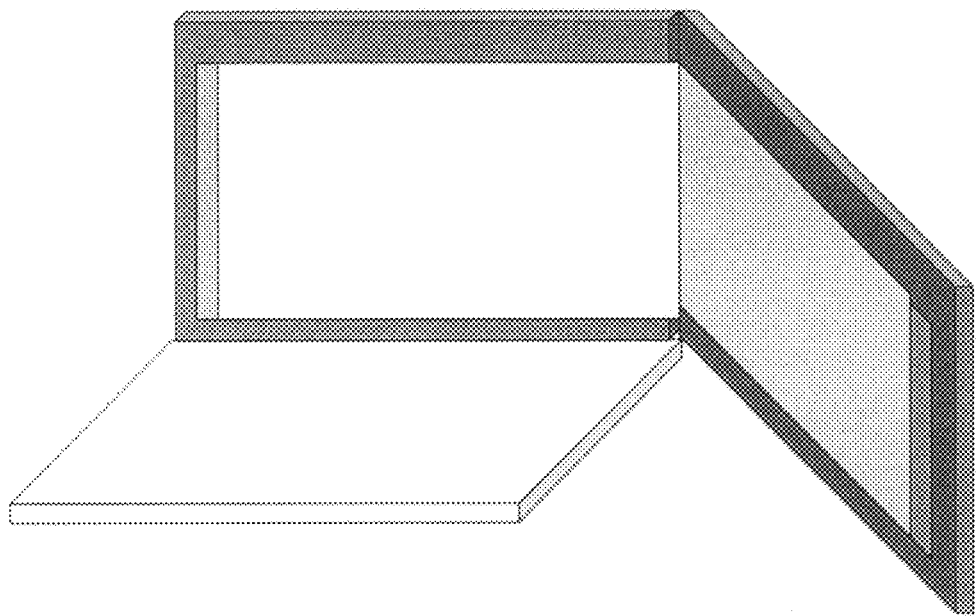

In this embodiment, since a notebook computer has a limited size, it is necessary to adjoin a plurality of screens (e.g. two screens) in order to obtain a large display area. The two screens of the notebook is folded together as shown in FIG. 21C when it is not used and, only in use, unfolded as shown in FIG. 21D and adjoined to each other as shown in FIG. 20A. Since each of the screens has its own frame, a seam, indicated with dark color in FIG. 21A, between the two screens occurs. The structure of the notebook computer is irrelevant to the present invention and a detailed description thereof is thus omitted. The following focuses on the method for eliminating the seam.

Taking the example of the screens being LCD screens, there is a very thin fiber layer or a very thin piece of glass on the surface of each of the LCD screens.

In the case of a very thin fiber layer on the surface of each of the LCD screens, the fiber layer is attached closely to the surface of each of the LCD screens. The fiber layer has a shape as shown in FIG. 4. The fibers on both sides are tilted toward the seam at an angle so that the whole image is translated by about 5 mm. All the fibers lean against each other, and each of them has a diameter equal to the size of a 4× lattice, that is about 0.5 mm. In order to increase the luminance of the display, a transparent adhesive can be used to bond the fibers. With such fiber layer transmitting the image, the effect shown in FIG. 21B can be obtained, and the seam is therefore eliminated.

In the case of a very thin piece of glass on the surface of each of the LCD screens, liquid crystal is below the glass, and a glass layer composed of translation glass units is superposed on the glass. The thickness of the glass layer is selected based on the width of the seam between the LCD screens. If the frame of each of the LCD screens is 5 mm wide, the seam is 10 mm wide, and the glass layer for translation need to shift the image by 5 mm. Therefore, it can be determined that the glass layer is generally about 5 mm. Since the minimum width of the current LCD frame is about 5 mm, the glass layer for translation is shaped as shown in FIG. 14 or 19, and the pieces of glass on the two LCDs are placed symmetrically and faced to each other, each of the parts of the image on the two screens can be shifted toward the seam by about 5 mm, respectively, and the seam is thus minimized. A layer of transparent thin film can also be placed above the glass layer to suppress the effect of the seam on the image.

FIG. 21C shows the state in which the two screens of the notebook are folded together and thus has a smaller size. FIG. 21D shows the state in which the screens are unfolded. FIG. 21A shows there is an obvious seam between the two screens in the unfolded state. FIG. 21B shows the effect obtained by adding a glass layer and then translating the partial images on the screens toward the seam.

2. Large- or Medium-Sized Display Device

Figure 22:
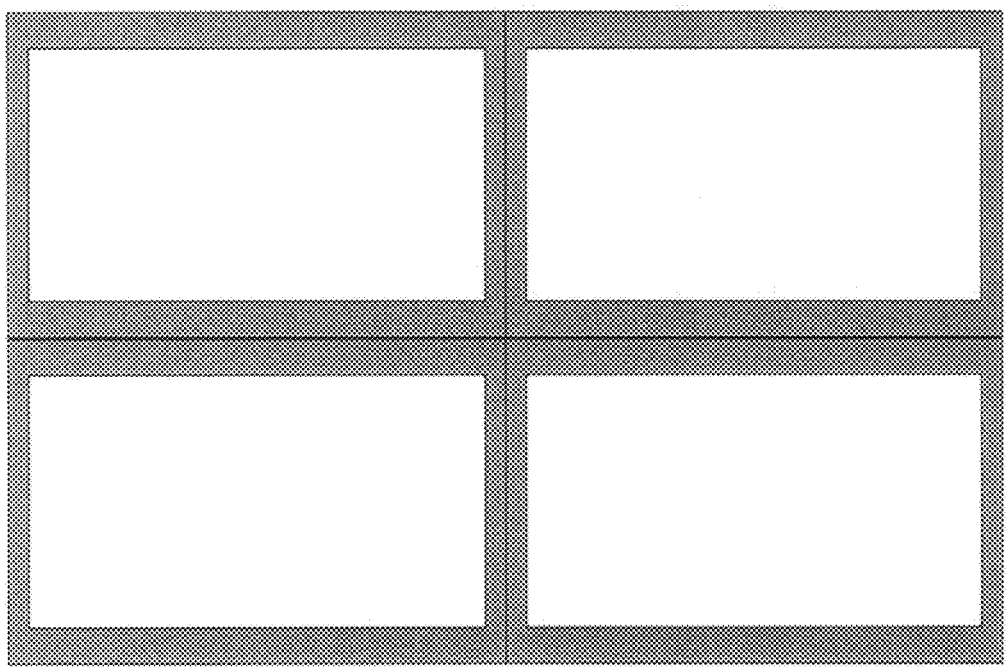
FIG. 22 is a schematic diagram for adjoining screens in a large-sized display device according to the present invention.

In a large- or medium-sized display device, 2×2 LCD screens can be adjoined together to form a large screen, as shown in FIG. 22. The method of FIG. 7 can be employed to eliminate the seam between these screens. More specifically, the ends of the fibers in the fiber layer are arranged close to each other, the size and shape of the arranged fibers coincide with the display area of the LCD screens (e.g. the diagonal is 17 inch, the length is 305 mm and the width is 230 mm) to be adjoined. The intervals between the other ends of the fibers are uniformly extended to such a suitable degree that a area formed by the other ends of the fibers can cover the four LCD screens as well as their frames. In this embodiment, each of the four LCD screens to be adjoined has a diagonal of 17 inch and a most narrow frame of 5 mm. Then, the size of the adjoined large screen is calculated as follows.

The length is 2×(305+2×5)=2×315=630 mm

The width is 2×(230+2×5)=2×240=480 mm

Figure 23:
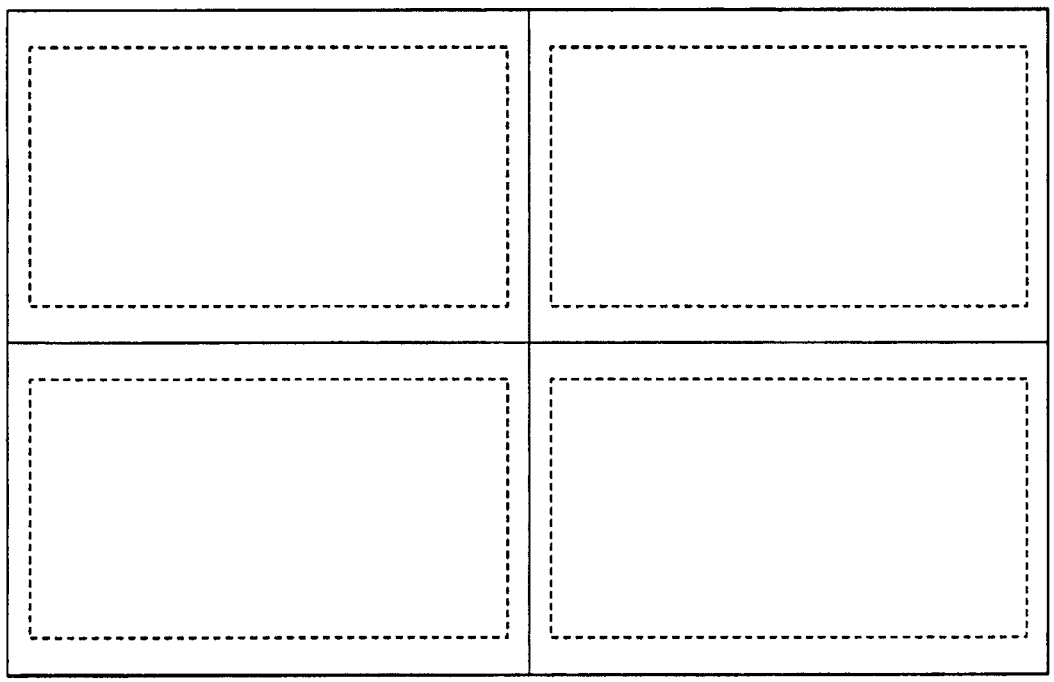
FIG. 23 is an effect diagram for the adjoined screen in a large-sized display device according to the present invention.

If a fiber of 0.5 mm in diameter is used, the number of fibers required for each of the LCD screens is 610×460, and the total number for the four LCD screens is 4×610×460. Here the infiltration process is adopted and a suitable adhesive is infiltrated into the intervals between the fibers. When the adhesive coagulates, the fibers can be cut in a suitable thickness. FIG. 23 is a schematic diagram showing the effect of the screen adjoining in a large-sized display device with the present invention. In other embodiment, the intervals between the other ends of the fibers can be extended unevenly and become large gradually or small gradually.

3. Mobile Phone with PDA Function

Figure 24:
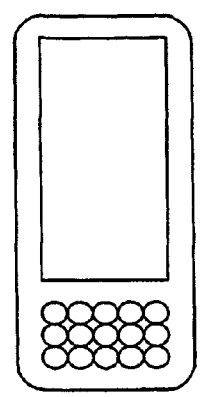
FIGS. 24 and 25 are schematic diagrams for applying the present invention to a PDA.
Figure 25:
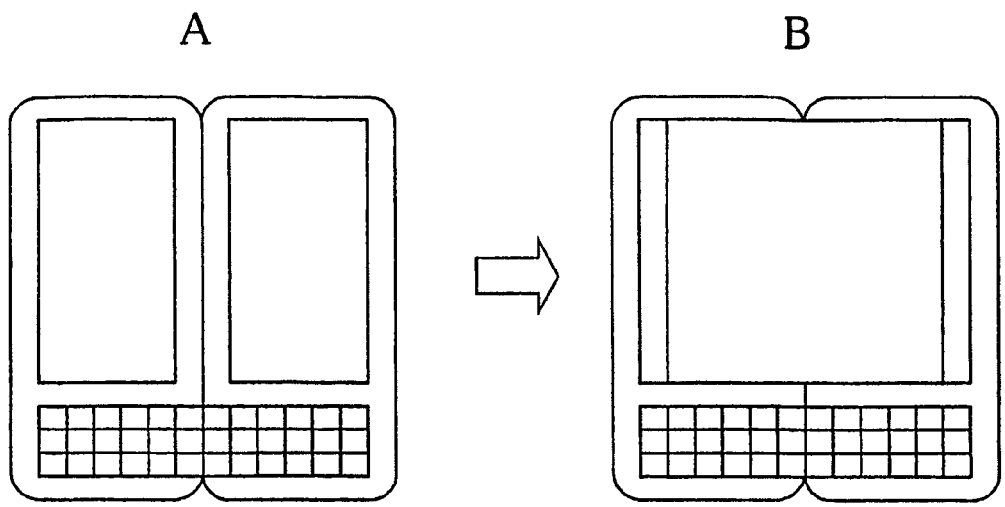

Today, with the development of mobile communication and the rapid popularization of digital mobile phone, the computing capability of a mobile device has been promoted remarkably, and the PDA function is integrated into a mobile phone. Since the screen of the mobile phone with PDA function is relatively small, it is inconvenient to input data, text or the like, the current mobile phone with PDA function cannot replace mobile office devices such as notebook computer. The predominant problem lies in the conflict between portability and easiness in use. If two screens of the same size are provided in the mobile phone with PDA function, the mobile phone is folded as shown in FIG. 24 and one of the screens is used when the mobile phone is used as a phone. On the other hand, when the PDA function or text input is executed, or when a text or an image is viewed, the two screens can be adjoined together to form a larger screen, as shown in FIG. 25. As the computing capability of an embedded mobile processor is continuously enhanced, and the capacity of a microstorage grows dramatically, it is possible to realize the functions of, for example, a notebook computer by this mobile phone with PDA function. As shown in FIG. 25A, there is also a seam between two screens during the process of adjoining. The method for image translation in the fourth embodiment can be employed to eliminate the seam and achieve the effect as shown in FIG. 25B.

Figure 26:
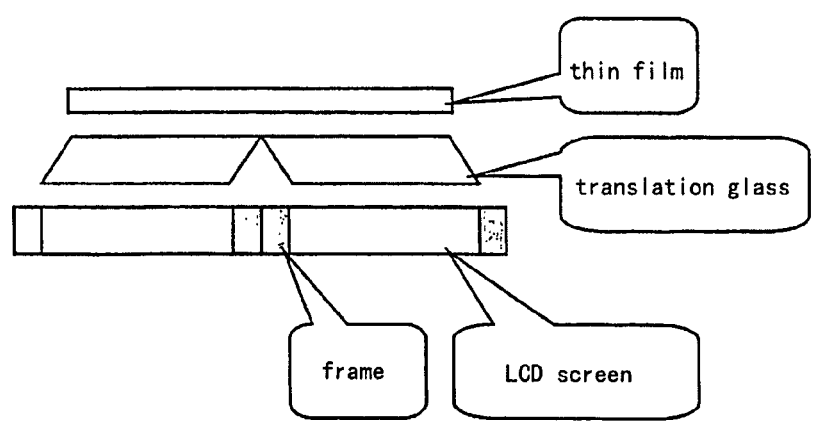
FIGS. 26 and 27 are schematic diagrams for applying the present invention to LCD screens, respectively.

More specifically, it is necessary to divide the image on the two screens. As shown in FIG. 26, the frame of each of the screens is 5 mm wide. Therefore, the translation distance by the translation glass is 5 mm, and the left part of the image, which is 5 mm wide and on the left-side screen will be translated by a distance equal to the width of the screen minus 5 mm. Accordingly, in preprocessing, a 5 mm-wide partial image on the right part of the screen should be moved to the left side of the image and then translated by the translation glass. The processing for the right-side screen is similar to that for the left-side screen except in an opposite direction. A layer of thin film can be further superposed above the translation glass for image reversion.

Figure 27:
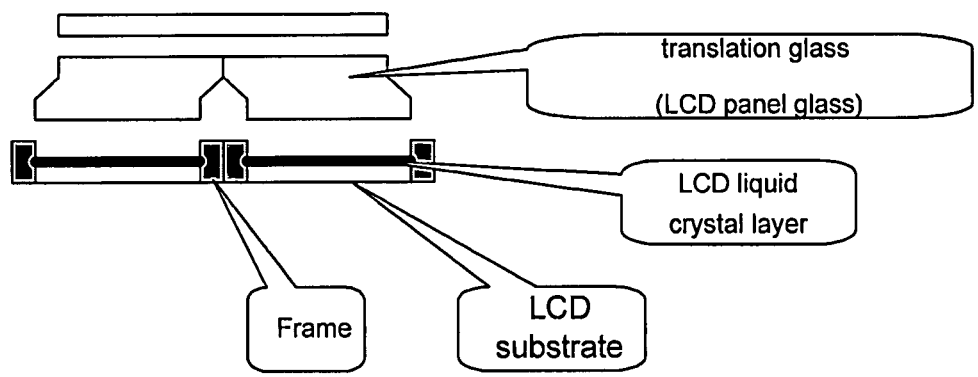

In FIG. 26, the LCD screens are separated from the translation glass. Since the image may be deteriorated during the transmission from the LCD screens to the translation glass, it is conceivable that the LCD screens and the translation glass are integrated. As shown in FIG. 27, the surface glass of the LCD screen can be shaped as that of the translation glass. This also facilitates difficulty in mounting.

The above description is made only on the preferable embodiment of the present invention and is not intended to limit the present invention. Any change, substitution or modification within the spirit and principle of the present invention should be included in the scope of the present invention.

What is claimed is:

1. A method for eliminating a seam between adjoined screens, comprising:
    Step A: acquiring an original image, dividing the original image displayed on the adjoined screens by a shape of an incident end of each translation units in an optical element, acquiring a corresponding division image by using the incident end of each of translation units, respectively, and adapting the acquired image to an image translation in subsequent Step B;
    Step B: translating the acquired image toward a position of the seam by bringing the division image into the corresponding translation units through incident ends of the translation units, totally reflecting incident light from the division image for even times in the translation unit based on a total reflection principle, and thus shifting in parallel the incident light toward the position of the seam between the adjoined screens, therefore translating each of the division images toward the position of the seam between the adjoined screens, respectively; and
    Step C: combining the translated division images by the translation units to reconstruct the original images to revert the translated image to the original image.

2. The method of claim 1, wherein said translating each of the division images toward the position of the seam between the adjoined screens respectively in Step B includes translating the division image on a first adjoined screen toward the seam between the adjoined screens by a first translation distance, and translating the division image on a second adjoined screen toward the seam between the adjoined screens by a second translation distance, a sum of the first translation distance and the second translation distance is equal to or greater than a width of the seam.

3. The method of claim 2, wherein said combining the divided and translated images by the translation units to reconstruct the original image in Step C further includes eliminating division gaps between the divided images through filtering.

4. The method of claim 1, wherein said shifting in parallel the incident light includes translating the incident light in a direction of x axis.

5. The method of claim 1, wherein said shifting in parallel the incident light includes translating the incident light in a direction of x axis and/or y axis.

6. The method of claim 1, wherein said even times for the total reflection is twice.

7. The method of claim 1, wherein said combining the divided and translated images by the translation units to reconstruct the original image in Step C further includes eliminating division gaps between the divided images through filtering.

8. A method for eliminating a seam between adjoined screens, comprising:
    Step A: acquiring an original image including cutting off a part of the original image that is close to the seam and to be translated, translating a remaining part of the image toward the seam by a distance equal to a width of the cut-off part, adjoining the cut-off part to the remaining part on a side far away from the seam, acquiring the image at the current position by the translation units in the optical element, and adapting the acquired image to an image translation in subsequent Step B;
    Step B: translating the acquired image toward the position of the seam, including making a partial image that is cut off and adjoined to the remaining part on the side far away from the seam enter the corresponding translation unit on one side of the optical element, reflecting the cut-off part for even times in the optical element based on a total reflection principle, and then emitting it from the translation unit on the other side of the optical element along the same direction as that of the image entering the translation unit, and making the remaining part enter the optical element at said current position as mentioned in Step A and exit from the optical element after its linear traveling; and
    Step C: reverting the translated image to the original image, including combining the translated cut-off part and the remaining part and reverting them to the original image.

9. The method of claim 8, wherein a width sum of said cut-off parts on all the adjoined screens is equal to or greater than a width of said seam.

10. The method of claim 8, wherein said cutting off a part of the original image and translating the remaining part and the cut-off part of the image is realized by changing a start display address and an end display address of a display adapter.

11. The method of claim 8, wherein said even times for the total reflection is twice.

12. An apparatus for eliminating a seam between adjoined screens, comprising:
    an image acquisition module configured for acquiring an original image and transmitting the acquired image to an image translation module;
    an image translation module configured for translating a received image toward a position of the seam so as to cover the seam by the translated image; and
    an image reversion module configured for receiving the translated image from the image translation module and reverting the image to the original one;
    wherein said image translation module is configured as an optical element composed of translation units, each of the translation units can translate an incident light toward the position of the seam based on a total reflection principle;
    said image acquisition module is configured for dividing the original image and acquiring the divided image in a unit of a sectional shape of said translation unit, and then transmitting the acquired divided image to a corresponding translation unit;
    each of the translation units in said image translation module is configured for translating each of the divided images toward the position of the seam, respectively,
    wherein each of said translation units is a translation unit in which the incident light can be totally reflected for even times; and
    said image reversion module is configured for receiving each of the division images translated by each of the translation units, and combining all the division images to reconstruct the original image.

13. The apparatus of claim 12, wherein said image translation module is fiber means, and each of said image acquisition module and said image reversion module respectively is separate means.

14. The apparatus of claim 13, wherein said fiber means is configured as follows:
    a first end of each of the fibers in the fiber means is brought to contact with the two adjoined screens such that a plane formed by all the first ends can cover an entire image displayed on the screens; an interval between linear transmission parts of the fibers remains constant, and the linear transmission parts are in contact with and connected adhesively to each other; and a second end of each of the fibers is tilted toward the position of the seam such that the plane formed by all the second ends can at least cover the seam;
    wherein the end of each of fibers close to the screens is said first end, and the end of each of fibers far away from the screens is said second end.

15. The apparatus of claim 13, wherein said fiber means is configured as follows:
    a first end of each of the fibers in the fiber means is brought to contact with the two adjoined screens such that a plane formed by all the first ends can cover an entire image displayed on the screens; an interval between gradually-curved transmission parts of the fibers remains constant, and the gradually-curved transmission parts are in contact with and connected adhesively to each other; and a second end of each of the fibers is tilted toward the position of the seam such that the plane formed by all the second ends can at least cover the seam;
    wherein the end of each of fibers close to the screens is said first end, and the end of each of fibers far away from the screens is said second end.

16. The apparatus of claim 13, wherein said fiber means is configured as follows:
    a first end of each of the fibers in the fiber means is brought to contact with the two adjoined screens such that a plane formed by all the first ends can cover an entire image displayed on the screens; an interval between linear transmission parts of the fibers is expanded to such an extent that the plane formed by all second ends, that is, the other ends of the transmission parts of the fibers, can cover the seam; and the transmission parts are in contact with and connected adhesively to each other;
    wherein the end of each of fibers close to the screens is said first end, and the end of each of fibers far away from the screens is said second end.

17. The apparatus of claim 12, wherein said image acquisition module is an independent means, and said image translation module and said image reversion module are fiber means.

18. The apparatus of claim 17, wherein said fiber means is configured as follows:
    a first end of each of the fibers in the fiber means is brought to contact with the two adjoined screens such that a plane formed by all the first ends can cover an entire image displayed on the screens; an interval between linear transmission parts of the fibers remains constant, and the linear transmission parts are in contact with and connected adhesively to each other; and a second end of each of the fibers is tilted toward the position of the seam such that the plane formed by all the second ends can at least cover the seam;
    wherein the end of each of fibers close to the screens is said first end, and the end of each of fibers far away from the screens is said second end.

19. The apparatus of claim 17, wherein said fiber means is configured as follows:
    a first end of each of the fibers in the fiber means is brought to contact with the two adjoined screens such that a plane formed by all the first ends can cover an entire image displayed on the screens; an interval between gradually-curved transmission parts of the fibers remains constant, and the gradually-curved transmission parts are in contact with and connected adhesively to each other; and a second end of each of the fibers is tilted toward the position of the seam such that the plane formed by all the second ends can at least cover the seam;
    wherein the end of each of fibers close to the screens is said first end, and the end of each of fibers far away from the screens is said second end.

20. The apparatus of claim 17, wherein said fiber means is configured as follows:
    a first end of each of the fibers in the fiber means is brought to contact with the two adjoined screens such that a plane formed by all the first ends can cover an entire image displayed on the screens; an interval between linear transmission parts of the fibers is expanded to such an extent that the plane formed by all second ends, that is, the other ends of the transmission parts of the fibers, can cover the seam; and the transmission parts are in contact with and connected adhesively to each other;
    wherein the end of each of fibers close to the screens is said first end, and the end of each of fibers far away from the screens is said second end.

21. The apparatus of claim 12, wherein said image reversion module is a separate means, and said image translation module and said image acquisition module are fiber means.

22. The apparatus of claim 21, wherein said fiber means is configured as follows:
    a first end of each of the fibers in the fiber means is brought to contact with the two adjoined screens such that a plane formed by all the first ends can cover an entire image displayed on the screens; an interval between linear transmission parts of the fibers remains constant, and the linear transmission parts are in contact with and connected adhesively to each other; and a second end of each of the fibers is tilted toward the position of the seam such that the plane formed by all the second ends can at least cover the seam;
    wherein the end of each of fibers close to the screens is said first end, and the end of each of fibers far away from the screens is said second end.

23. The apparatus of claim 21, wherein said fiber means is configured as follows:
    a first end of each of the fibers in the fiber means is brought to contact with the two adjoined screens such that a plane formed by all the first ends can cover an entire image displayed on the screens; an interval between gradually-curved transmission parts of the fibers remains constant, and the gradually-curved transmission parts are in contact with and connected adhesively to each other; and a second end of each of the fibers is tilted toward the position of the seam such that the plane formed by all the second ends can at least cover the seam;
    wherein the end of each of fibers close to the screens is said first end, and the end of each of fibers far away from the screens is said second end.

24. The apparatus of claim 21, wherein said fiber means is configured as follows:
a first end of each of the fibers in the fiber means is brought to contact with the two adjoined screens such that a plane formed by all the first ends can cover an entire image displayed on the screens; an interval between linear transmission parts of the fibers is expanded to such an extent that the plane formed by all second ends, that is, the other ends of the transmission parts of the fibers, can cover the seam; and the transmission parts are in contact with and connected adhesively to each other;
wherein the end of each of fibers close to the screens is said first end, and the end of each of fibers far away from the screens is said second end.

25. The apparatus of claim 12, wherein said image translation module is fiber means composed of an entire tilted fiber, and
said image acquisition module and/or image reversion module is a software module or an optical element.

26. The apparatus of claim 25, wherein said fiber means is configured as follows:
a first end of each of the fibers in the fiber means is brought to contact with the two adjoined screens such that a plane formed by all the first ends can cover an entire image displayed on the screens; an interval between linear transmission parts of the fibers remains constant, and the linear transmission parts are in contact with and connected adhesively to each other; and a second end of each of the fibers is tilted toward the position of the seam such that the plane formed by all the second ends can at least cover the seam;
wherein the end of each of fibers close to the screens is said first end, and the end of each of fibers far away from the screens is said second end.

27. The apparatus of claim 25, wherein said fiber means is configured as follows:
a first end of each of the fibers in the fiber means is brought to contact with the two adjoined screens such that a plane formed by all the first ends can cover an entire image displayed on the screens; an interval between gradually-curved transmission parts of the fibers remains constant, and the gradually-curved transmission parts are in contact with and connected adhesively to each other; and a second end of each of the fibers is tilted toward the position of the seam such that the plane formed by all the second ends can at least cover the seam;
wherein the end of each of fibers close to the screens is said first end, and the end of each of fibers far away from the screens is said second end.

28. The apparatus of claim 25, wherein said fiber means is configured as follows:
a first end of each of the fibers in the fiber means is brought to contact with the two adjoined screens such that a plane formed by all the first ends can cover an entire image displayed on the screens; an interval between linear transmission parts of the fibers is expanded to such an extent that the plane formed by all second ends, that is, the other ends of the transmission parts of the fibers, can cover the seam; and the transmission parts are in contact with and connected adhesively to each other;
wherein the end of each of fibers close to the screens is said first end, and the end of each of fibers far away from the screens is said second end.

29. The apparatus of claim 12, wherein a sectional surface of each of said translation units is shaped as a rhombus, said rhombus has an acute angle of 45° and a side equal to a distance by which each of said translation units shifts the image.

30. The apparatus of claim 29, wherein said rhombus is formed by combining two isosceles triangles each with a right angle.

31. The apparatus of claim 12, wherein a material and shape of said optical element make a critical angle C as small as possible.

32. The apparatus of claim 12, wherein each of said translation units is shaped as a rhombus prism.

33. The apparatus of claim 12, wherein said translation units are integrated into the screens.

34. The apparatus of claim 12, wherein said image reversion module further includes a filtering module for filtering a combined image to eliminate division gaps.

35. The apparatus of claim 34, wherein said filtering module is a low-pass filter.

36. The apparatus of claim 34, wherein said low-pass filter is formed of a thin film.

37. An apparatus for eliminating a seam between adjoined screens, comprising:
an image acquisition module configured for acquiring an original image and transmitting the acquired image to an image translation module;
the image translation module configured for translating a received image toward a position of the seam so as to cover the seam by a translated image; and
an image reversion module configured for receiving the translated image from the image translation module and reverting the image to the original one
wherein said image acquisition module is configured for cutting off a part of the original image that is close to the seam, shifting the remaining part of the image toward the seam by a distance equal to the width of the cut-off part, and translating and adjoining the cut-off part to the remaining part on the side far away from the seam;
said image translation module is configured as an integral optical element of which both sides are translation units, the translation units are designed to translate the cut-off part toward the position of the seam by a distance equal to a difference between a width of the original image and the width of the cut-off part, and a rest of the integral optical element is designed to transmit the remaining part of the original image directly to said image reversion module; and
said image reversion module is configured for combining the translated cut-off part and the remaining part and reverting them to the original image, wherein each of said translation units is a translation unit in which an incident light can be totally reflected for even times.

38. The apparatus of claim 37, wherein a sectional surface of each of said translation units is shaped as a rhombus, said rhombus has an acute angle of 45° and a side equal to a distance by which each of said translation units shifts the image.

39. The apparatus of claim 37, wherein a material and shape of said optical element make a critical angle C as small as possible.

40. The apparatus of claim 37, wherein each of said translation units is shaped as a rhombus prism.

41. The apparatus of claim 37, wherein said translation units are integrated into the screens.

* * * * *

UNITED STATES PATENT AND TRADEMARK OFFICE
CERTIFICATE OF CORRECTION

| | | |
|---|---|---|
| PATENT NO. | : 8,907,863 B2 | Page 1 of 1 |
| APPLICATION NO. | : 11/667885 | |
| DATED | : December 9, 2014 | |
| INVENTOR(S) | : Zhongqing Li | |

It is certified that error appears in the above-identified patent and that said Letters Patent is hereby corrected as shown below:

Title page, Inventor: delete "(76)", and insert --(75)--.

Title page, insert item (73) to read:

--(73) ASSIGNEE: LENOVO (BEIJING) LIMITED
        BEIJING, CHINA--.

Signed and Sealed this
Eighth Day of December, 2015

Michelle K. Lee
*Director of the United States Patent and Trademark Office*